United States Patent [19]

Tanaka et al.

[11] Patent Number: 4,961,204
[45] Date of Patent: Oct. 2, 1990

[54] PCM SIGNAL GENERATING/REPRODUCING APPARATUS

[75] Inventors: Hiromichi Tanaka, Ebina; Takao Arai, Yokohama; Toshifumi Takeuchi, Yokohama; Seiichi Saito, Yokohama, all of Japan

[73] Assignee: Hitachi, Ltd., Tokyo, Japan

[21] Appl. No.: 353,709

[22] Filed: May 18, 1989

[30] Foreign Application Priority Data

May 23, 1988 [JP] Japan .................................. 63-123828
Jun. 22, 1988 [JP] Japan .................................. 63-152294

[51] Int. Cl.$^5$ ........................................... H04B 14/04
[52] U.S. Cl. ........................................ 375/25; 360/32
[58] Field of Search ............... 375/25, 26, 33, 34; 370/110.1, 111, 118, 102; 360/32, 35.1

[56] References Cited

U.S. PATENT DOCUMENTS 4,523,237  6/1985  Fukuda et al. ............... 360/32 X
4,622,600  11/1986 Okamoto et al. .............. 360/32
4,816,926  3/1989  Moriwaki et al. ............. 360/32 X Primary Examiner—Benedict V. Safourek
Assistant Examiner—Tesfaldet Bocure
Attorney, Agent, or Firm—Antonelli, Terry, Stout & Kraus

[57] ABSTRACT

A PCM signal processing apparatus for recording or reproducing a PCM signal. The PCM signal reproducing apparatus of the invention is constituted by: a data addition circuit for receiving a first signal composed of n bits per word (n being an integer) and a second signal composed of n' bits per word (n' being an integer) as mode inputs different from each other, and for adding fixed data of (n−n') bits to every word of the second signal to thereby generate a third signal; a first switch device for receiving the first and third signals and for selectively outputting one of the first and third signals; a symbol generation circuit for converting every word of the output of the first switch device into symbol data of m×1 bits (n>1); a signal processing circuit for performing at least interleave processing, error correction code generating processing, and addition of a synchronizing signal, on the output of the symbol generation circuit, to thereby generate a first data frame; a data deletion circuit for deleting the fixed data from the first data frame of the signal processing circuit to thereby generate a second data frame; and a second switch devices for receiving the first data frame from the signal processing circuit and the second data frame from the data deletion circuit.

24 Claims, 32 Drawing Sheets

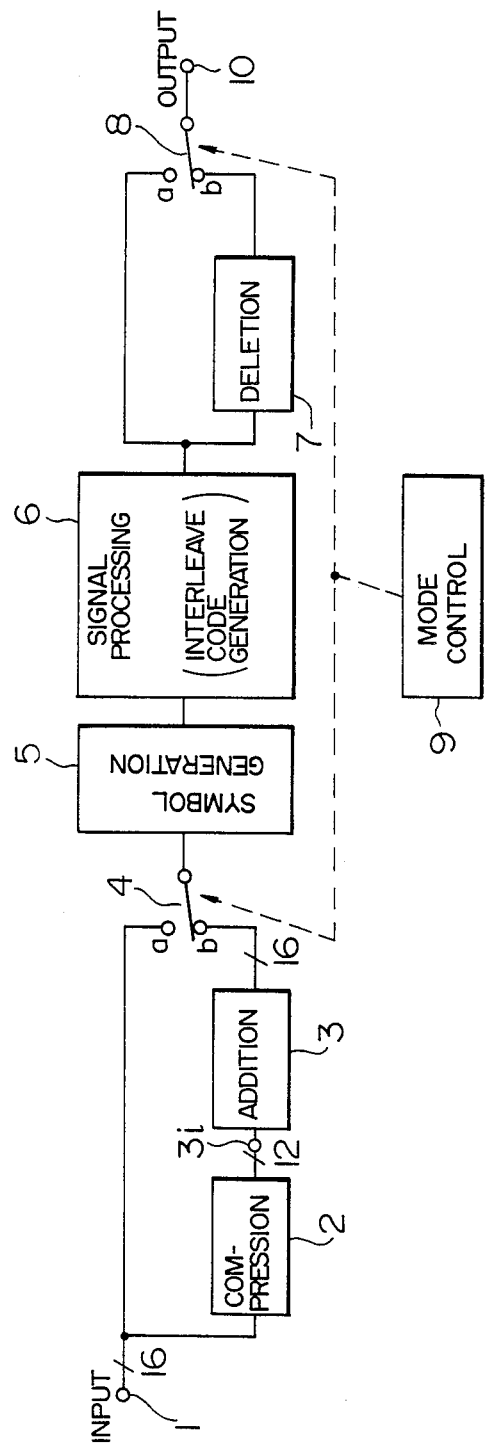

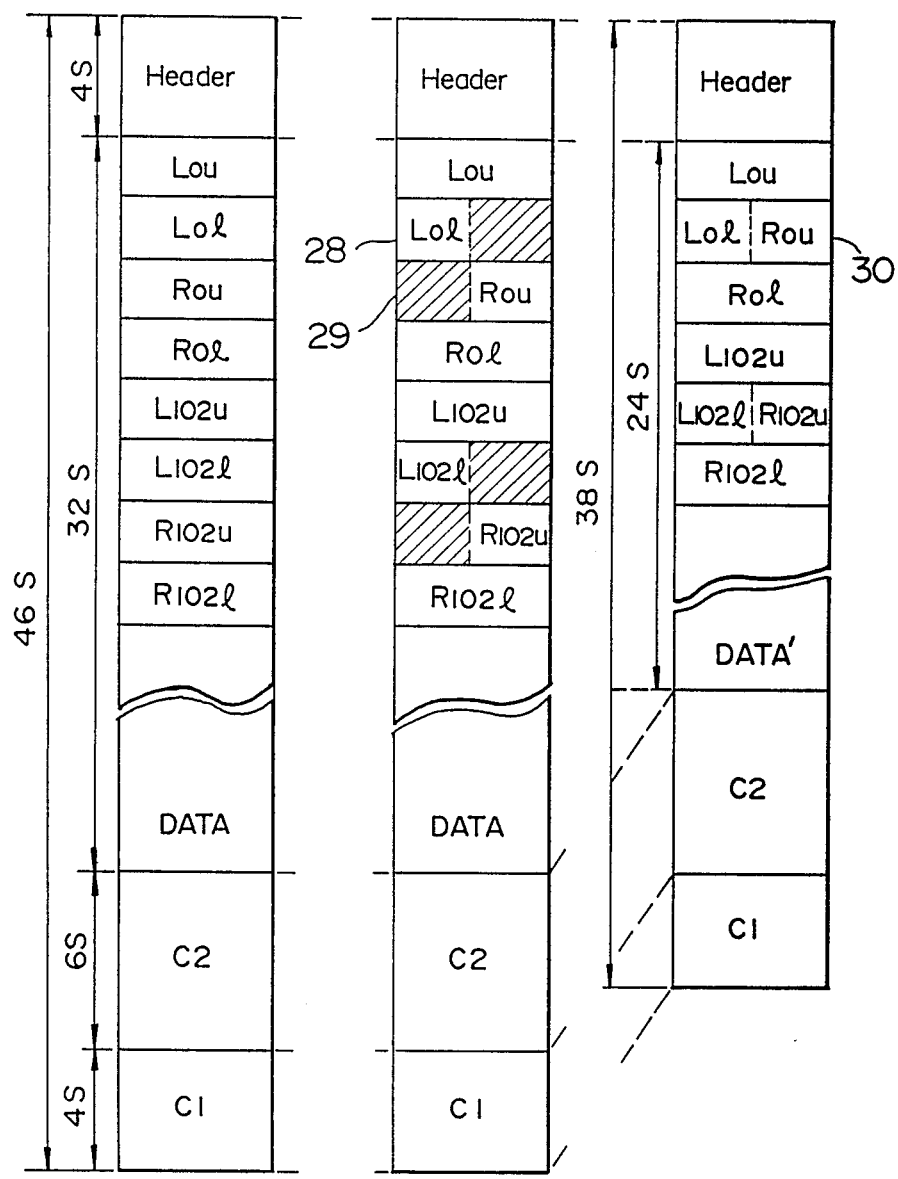

FIG. 12(b)  FIG. 12(b)'  FIG. 12(c)
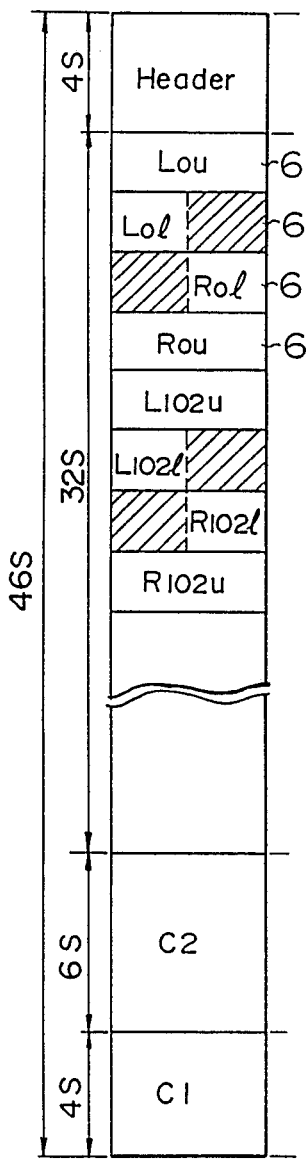
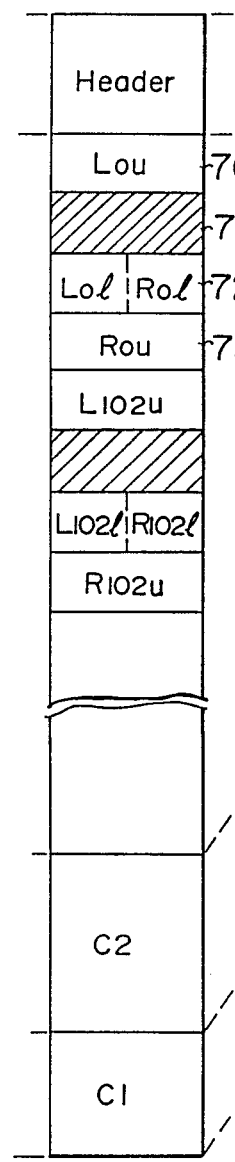
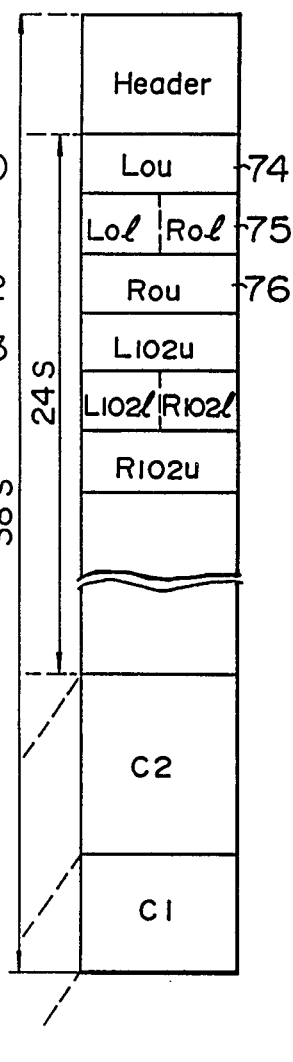

FIG. 26

| BLOCK 0 | 1 | 2 | 3 | 4 | 5 | 6 | 7 | | BLOCK 68 | 69 |
|---|---|---|---|---|---|---|---|---|---|---|
| L0u | L0$\ell$ | R0u | R0$\ell$ | L2u | L2$\ell$ | R2u | R2$\ell$ | | L1u | L1$\ell$ |
| L24u | L24$\ell$ | R24u | R24$\ell$ | L26u | L26$\ell$ | R26u | R26$\ell$ | | L25u | L25$\ell$ |
| L48u | L48$\ell$ | R48u | R48$\ell$ | L50u | L50$\ell$ | R50u | R50$\ell$ | | L49u | L49$\ell$ |
| L72u | L72$\ell$ | R72u | R72$\ell$ | L74u | L74$\ell$ | R74u | R74$\ell$ | | L73u | L73$\ell$ |
| L96u | L96$\ell$ | R96u | R96$\ell$ | L98u | L98$\ell$ | R98u | R98$\ell$ | | L97u | L97$\ell$ |
| L120u | L120$\ell$ | R120u | R120$\ell$ | L100u | | | | | | |
| L144u | L144$\ell$ | | | | | | | | | |

INTER-BLOCK C2 CODE GENERATING LINE

INTRA-BLOCK C1 CODE GENERATING LINE

PCM SIGNAL GENERATING/REPRODUCING APPARATUS

BACKGROUND OF THE INVENTION

The present invention generally relates to an apparatus for recording/reproducing or transmitting/receiving a PCM (pulse code modulation) signal, and particularly relates to a PCM data generating/reproducing circuit applicable to digital data different from each other in recording rate or in transmission rate.

As the apparatus for recording/reproducing a PCM audio signal on/from a magnetic tape, for example, digital audio tape recorders (DATs) are known. The DATs and another group of R-DATs use rotary heads. Standardization of the R-DATs is stated in "DIGITAL AUDIO TAPERECORDER SYSTEM", The DAT Conference, c/o Electronic Industries Association of Japan, June 1987. In a DAT, the sampling frequency is fundamentally set to 48 kHz, that is, a 48k-mode. A 44k-mode having a sampling frequency of 44.1 kHz and a 32k-mode having a sampling frequency of 32 kHz are used other than the 48k-mode. The frame format of a recording signal is formed on the basis of the 48k-mode, and the other 44k- and 32k-modes apply correspondingly to the 48k-mode. Compared with the 48k-mode, the 32k-mode has an idle data area portion because data for the 32k-mode are stored in its data area having a capacity for the 48k-mode in spite of the fact that the 32k-mode has an amount of information per unit time which is smaller than that of the 48k-mode. The data area of the frame format has data addresses from 0 to 1455 and the data addresses from 0 to 1439 are efficiently used in the 48k-mode. In the 32k-mode, however, only the data addresses from 0 to 959 are used. If comparison is made as to redundancy (in the above-mentioned document, page 47), the redundancy is 58.3% in the 32k-mode, while 37.5% in the 48k-mode.

Further, with respect to the DATs, no protocol has been defined concerning the processing of two modes different from each other in amount of information, that is, 16-bit linear recording and 16-12 compression non-linear recording in the same 48 kHz sampling 2 channels.

Accordingly, there has been a problem in that, if data of the 32k-mode in which the amount of information is smaller than that in the 48k-mode are entered into a PCM signal generating device set to the 48k-mode to thereby generate a PCM signal having a signal format common to that of the 48k-mode, the redundancy of the generated PCM signal becomes unnecessarily high.

SUMMARY OF THE INVENTION

It is a first object of the present invention to provide a PCM signal generating/reproducing apparatus in which signals different in mode from each other can be processed by a single apparatus.

It is a second object of the present invention to provide a PCM signal generating/reproducing apparatus in which redundancy of each of PCM signals is made suitable even in the case where the signals are different in mode from each other so as not to raise the recording/reproducing rate.

It is a third object of the present invention to provide a PCM signal generating/reproducing apparatus in which no error propagation is generated in a signal format which was subject to addition or deletion of fixed data.

In order to attain the foregoing objects of the present invention, the PCM signal generation apparatus for recording/transmitting a PCM signal according to the present invention is arranged so that: a first signal composed of n bits per word (n being an integer) and a second signal composed of n' bits per word (n' being an integer) are received as inputs different in mode; adding fixed data of (n−n') bits are added to every word of the second signal in the mode of the second signal to thereby generate a third signal having a signal format common to the first signal; every word a selected one of the first and third signals is converted into symbol data of m×l bits (n>l); the converted symbol data are subject to signal processing including at least interleave processing, error correction code generating processing, and addition of a synchronizing signal to thereby generate a first data frame; and the fixed data are deleted from the first data frame in the mode of the second signal to thereby generate a second data frame.

Further, in the case where group code modulation is performed on the symbol basis, it is possible to prevent inter-symbol error propagation from occurring by adding fixed data to every symbol.

BRIEF DESCRIPTION OF THE DRAWINGS

Other features and advantages of the present invention will be apparent from the following description taken in connection with the accompanying drawings, wherein:

FIG. 1 is a block diagram showing an embodiment of the PCM signal generating circuit according to the present invention;

FIGS. 10a, 10b, 10c, 11a, 11b, 11c, 12b, 12b' and 12c are constituent diagrams showing further embodiments of the data block;

FIGS. 26 and 27 are diagrams showing a data configuration in the data frame;

DESCRIPTION OF THE PREFERRED EMBODIMENTS

Figures 2A, 2B:
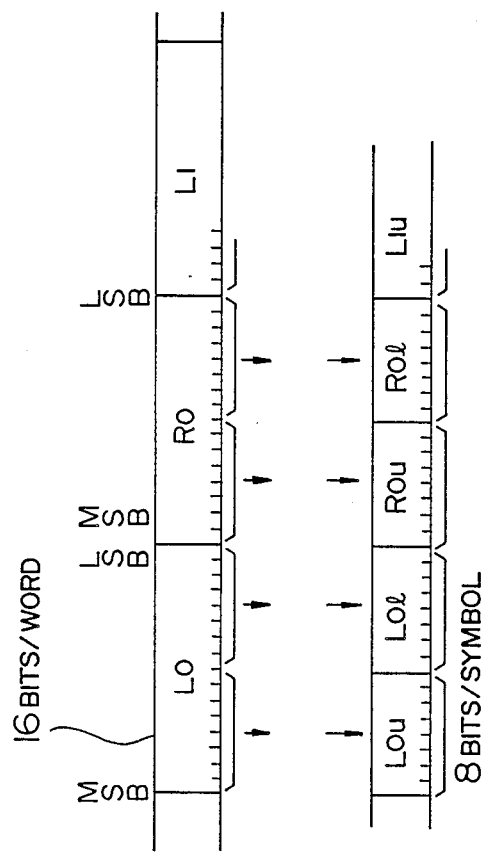
FIGS. 2a and 2b are diagrams for explaining generation of symbol data in the circuit of FIG. 1.

Referring now to the accompanying drawings, embodiments of the present invention will be described hereunder. FIG. 1 is a block diagram showing an embodiment of the PCM data generating/transferring apparatus according to the present invention. In the drawing, the PCM data generating/transferring apparatus is constituted by a data input terminal 1, a digital compression circuit 2, a data addition circuit 3, a data input terminal 3i for a data addition circuit, a first switch 4, a symbol data generation circuit 5, a signal processing circuit 6, a data deletion circuit 7, a second switch 8, a mode control circuit 9, and a data output terminal 10.

The operation of the apparatus will be described hereunder. The apparatus converts an analog audio signal or the like into a digital audio signal so as to generate a PCM signal to be recorded on a magnetic tape or the like. The generated PCM signal has a data frame A corresponding to a mode A or a data frame B corresponding to a mode B. If the respective contacts a are selected in the first and second switches 4 and 8, a PCM signal having a data frame A is generated, while if the respective contacts b in the first and second switches 4 and 8 are selected, a PCM signal having a data frame B is generated. Description will now be made as to the mode A in the case where the first and second switches 4 and 8 are changed over to the a side contacts. Data applied to the data input terminal 1 are sample data formed in such a manner that an analog audio signal is sampled at a sampling frequency $F_s$, for example 48 kHz so as to compose every word of n bits, for example 16 bits per word in this embodiment. The 16-bit/word sample data are applied to the symbol data generation circuit 5 through the first switch 4. The symbol data generation circuit 5 converts the 16-bit/word sample data into symbol data each composed of l bits, for example 8 bits in this embodiment. That is, one of the sample data is composed of two m symbols, for example 2 symbols in this embodiment. Next, the signal processing circuit 6 interleaves input symbol data so as to generate an error correcting code from the interleaved data, and adds the thus obtained error correcting code to the sample data. Then, the signal processing circuit 6 adds a synchronizing signal and a control signal (for example, identification data for identifying data contents or the like) to the sample data so as to constitute a data frame. The thus generated data frame is put out as a data frame A corresponding to the mode A through the output terminal 10 and led to a recording circuit (not shown). Referring to the typical diagram of FIG. 2, description will be made as to the symbol data generation system in the symbol data generation circuit 5. The diagram (a) of FIG. 2 shows input sample data in which every word is composed of 16 (n) bits. Upper 8 bits (l bits) and lower 8 bits (l bits) of every word are assigned to two symbols respectively so as to generate symbol data as shown in the diagram (b) of FIG. 2. In FIG. 2, characters L and R represent left and right audio data respectively, the suffix numerals represent the numbers on a time series, and suffix letters "u" and "l" represent upper and lower rank bits respectively. The 8-bit symbol data are used as a fundamental unit of signal processing. All the error correcting code, synchronizing signals, and the like generated in the signal processing circuit 6 are composed of symbols that are each made up of 8 bits (l bits).

Figure 3:
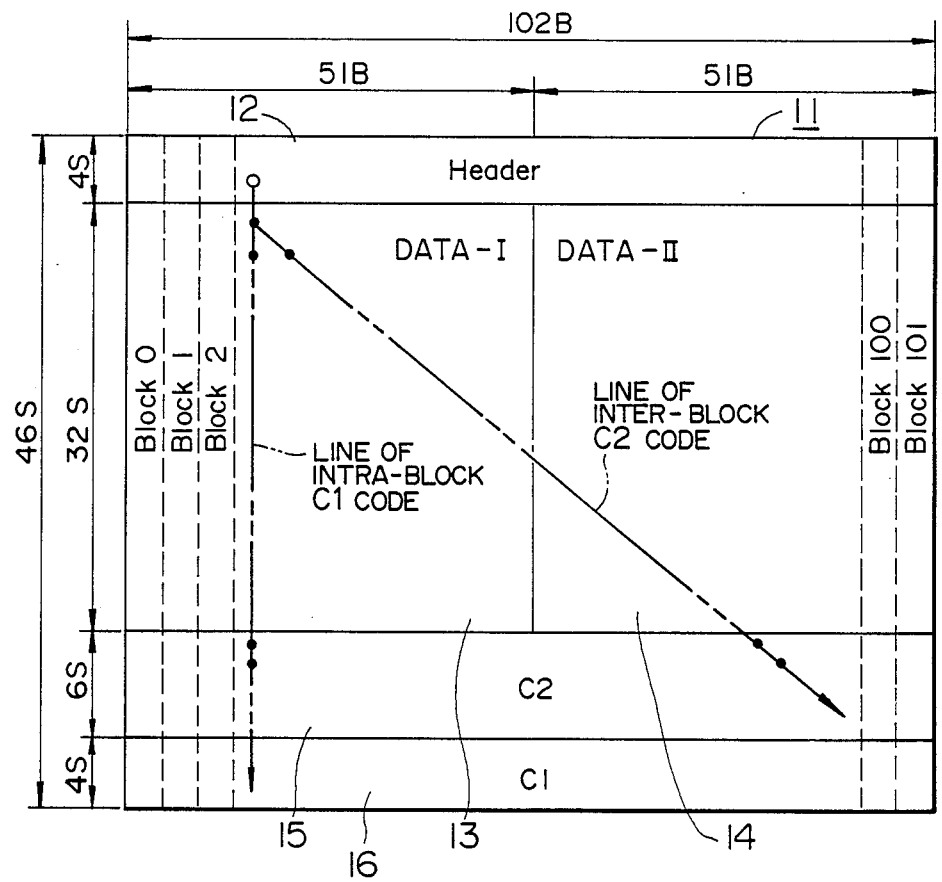
FIG. 3 is a constituent diagram showing a data frame in the circuit of FIG. 1.

Next, description will be made as to a data frame to be generated in the signal processing circuit 6. FIG. 3 is a diagram showing a data frame. In the drawing, the reference numeral 11 designates the whole of a data frame; 12, a header; 13, symbol data corresponding to the even number data in the order of sample data on the time series; and 14, symbol data corresponding to the odd number data in the order of sample data on the time series. The reference numeral 15 designates an inter-block C2 code, and the reference numeral 16 designates an intra-block C1 code. In FIG. 3, the character "S" is a unit representing a symbol and "B" is a unit representing a block. One data frame is constituted by 102 blocks arranged side by side horizontally, each block being constituted by 48 vertically-arranged symbols. The relationship between the interleave and the error correcting code, that is, the intra-block C1 code and inter-block C2 code, is a so-called diagonal interleave which is completed within one data frame. For example, Read-Solomon Code may be employed in the error correcting code. With the 32 symbols of symbol data as information, the inter-block C2 code 15 is composed of 6 symbols, the code configuration being RS (38, 32, 7). With the 32 symbols of symbol data and the 6 symbols of inter-block C2 code, totaling 38 symbols, as information, the intra-block C1 code 16 is composed of 4 symbols, the code configuration being RS (42, 38, 5). Alternatively, if one symbol of a block address in the header is added as further information, the code configuration including the intra-block C1 code becomes RS (43, 39, 5).

Figure 4:
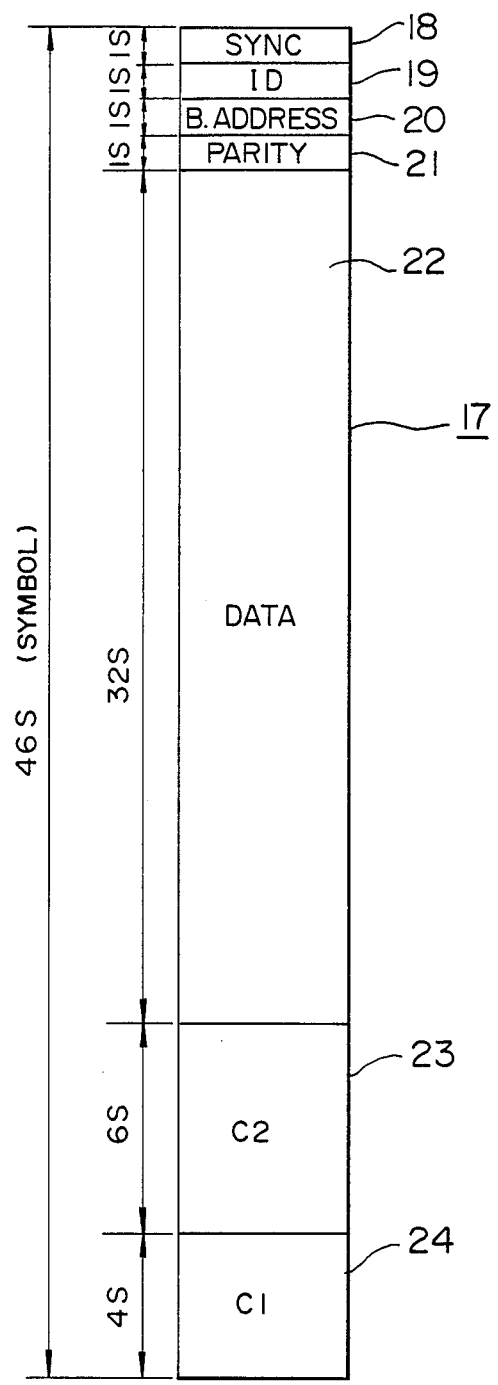
FIG. 4 is a constituent diagram showing a data block in the data frame of FIG. 3.

Next, the data configuration in each block will be described in detail. FIG. 4 is a diagram showing a block. The reference numeral 17 designates the whole of the block; 18, a synchronizing signal indicating the head of the block; 19, an identification signal indicating audio contents or the like; 20, a block address indicating the order of the block; and 21, a parity signal for checking errors in the identification signal 19 and the block address 20 in reproduction. The reference numeral 22 designates symbol data in the block; 23, an inter-block C2 code; and 24, an intra-block C1 code. The symbol data are composed of 32 symbols, and the block is composed of 46 symbols as a whole.

The data frame 11 of the mode A generated in the signal processing circuit 6 is put out from the data output terminal 10 in the order of the block 0, the block 1, . . . , the block 101.

Figure 5:
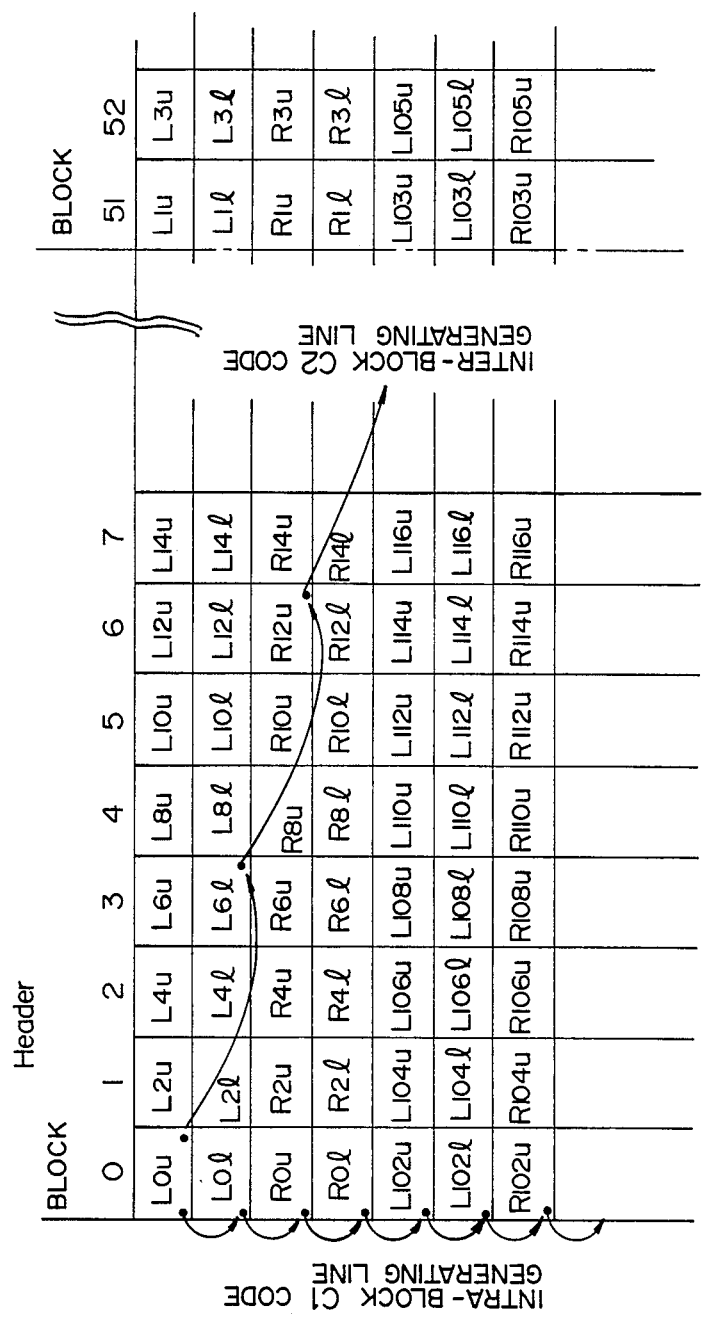
FIG. 5 is a diagram showing a data configuration in the data frame.

Next, description will be made in detail as to the configuration of the symbol data in the data frame. FIG. 5 is a diagram for partially explaining the data configuration in the data frame. The even number data and the odd number data are alternately arranged so that the former are disposed on the left side of the frame and the latter are disposed on the right side of the same as described above, and upper-rank symbol data and lower-rank symbol data are arranged so as to make respective pairs vertically. The intra-block C1 code is generated vertically, that is, within the block. The inter-block C2 code is generated diagonally, on the contrary, with the symbols, for example, $L_{0\mu}$, $L_{6l}$, $R_{12\mu}$, $L_{18l}$ . . . . In this case, if the interleave for generating the inter-block C2 code is performed on the basis of a rule of 3B, 3B, 2B, 3B, 3B, 2B, . . . , expressed by pitches of jumped blocks, the interleave is completed within one data frame and located substantially on the diagonal.

Data put out from the data output terminal 10 are sent to the recording circuit on the symbol basis, and the recording circuit performs, for example, 8–10 modulation so as to convert an 8-bit signal into a 10-bit code. The 8–10 modulation is described in the above-mentioned document "AUDIO TAPERECORDER SYSTEM". Also at this time, conveniently, processing can be performed on the symbol basis.

The operation when the mode B is set will be described hereunder. The mode B is established in order to lower the recording rate to a rate lower than that of the mode A.

Figures 6A, 6B, 6C, 6D:
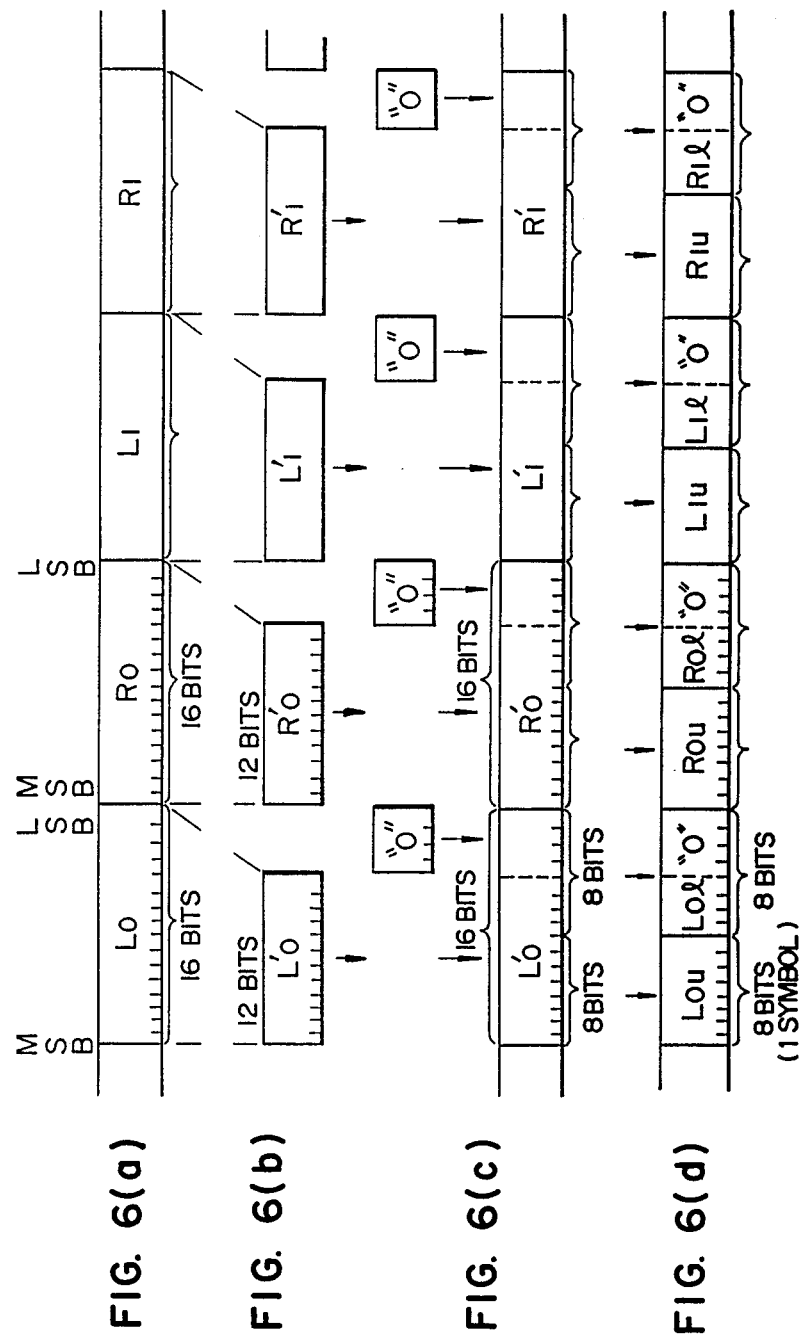
FIGS. 6a–6d are diagrams for explaining another embodiment of symbol data generation.

In the circuit block diagram of FIG. 1, the sample data composed of 16 bits (n bits) per word and applied to the data input terminal 1 is applied to the symbol data generation circuit 5 through the digital compression circuit 2, the data addition circuit 3, and the first switch 4. The symbol data put out from the symbol data generation circuit 5 is processed in the signal processing circuit 6 in the same manner as in the mode A. The output of the signal processing circuit 6 is transferred to the data output terminal 10 through the data deletion circuit 7 and the second switch 8. The digital compression circuit 2 operates to convert a first signal of n-bit/word (16-bit/word in this embodiment) sample data into a second signal of n'-bit/word (12-bit/word in this embodiment) sample data. This method makes the best use of the characteristic of a sound and reduces the sound in quality deterioration. Referring to the drawings, digital compression and data addition will be described. In FIG. 6, the diagram (a) shows input sample data, and (b) show digital-compressed sample data composed of 12 bits per word. Fixed data composed of (n-n') bits, for example 4 bits in this embodiment, of "0" is added to the 12 bits of every word of the second sample data so as to obtain a third signal which is 16-bit/word data as shown in the diagram (c) of FIG. 6. That is, the fixed 4-bit data of "0" are added to the second signal in the data addition circuit 3 so to obtain the third signal, which is the 16-bit/word data, at the output of the data addition circuit 3. The 16-bit/word data are converted by the symbol data generation circuit 5 into 8-bit symbol data as shown in the diagram (d) of FIG. 6. Thus, the data having symbols equal in number to those in the mode A can be applied to the signal processing circuit 6. The components of the fixed data are not always limited to "0".

Figure 7:
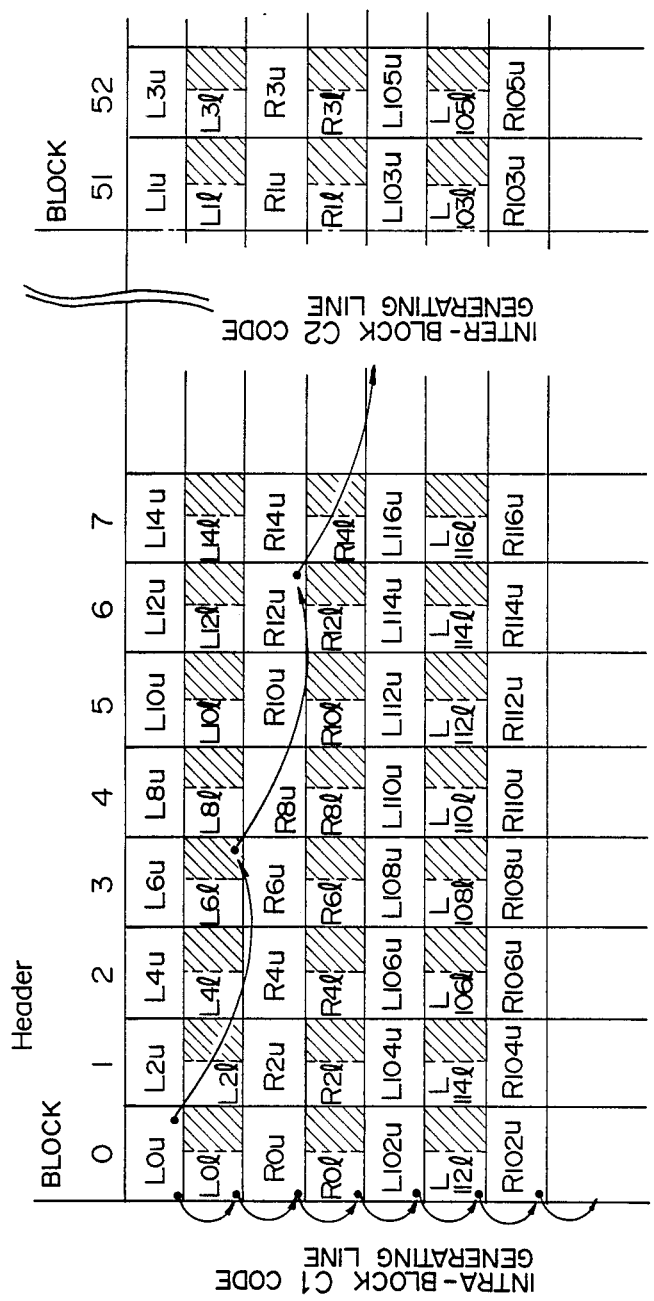
FIG. 7 is a diagram showing a data configuration in the data frame.

As described above, since the data symbols in the mode B are made equal in number to those in the mode A although information is compressed in the mode B, the data frame B of the mode B generated in the signal processing circuit 6 is apparently the same as the data frame A in the mode A. The data frame B is however different from the data frame A in that the former contains the fixed data. Referring to the data configuration shown in FIG. 7, the difference will be described. FIG. 7 is a view showing the data configuration of a portion of the data frame B in the mode B. The hatched portions are the fixed data composed of "0". The data configuration diagram of FIG. 7 is similar to the data configuration diagram of FIG. 5 showing the data frame A. That is, the two data configurations are the same with each other in all of time series numbers L and R of the respective data and also in relation of generation of the intra-block C1 code and the inter-block C2 code.

Next, the data frame configuration of the data frame B at the data output terminal 10 will be described. In the mode B, in order to lower the record rate, the fixed data of "0" are deleted by the data deletion circuit 7 and the data from which the fixed data have been removed are transferred to the succeeding recording circuit. At this time, the fixed data of "0" may be simply deleted in the case where the system of a modulation circuit included in the recording circuit is a non-block-modulation system, for example, such as an FM system, a QPSK system, or the like. In the case of a block modulation system, for example, such an 8–10 modulation system or the like as described above, it is possible to reduce error propagation in reproduction if the configuration of the symbol data is changed in such a manner as follows. An example of such a symbol data configuration is shown in FIG. 8.

Figure 8A:
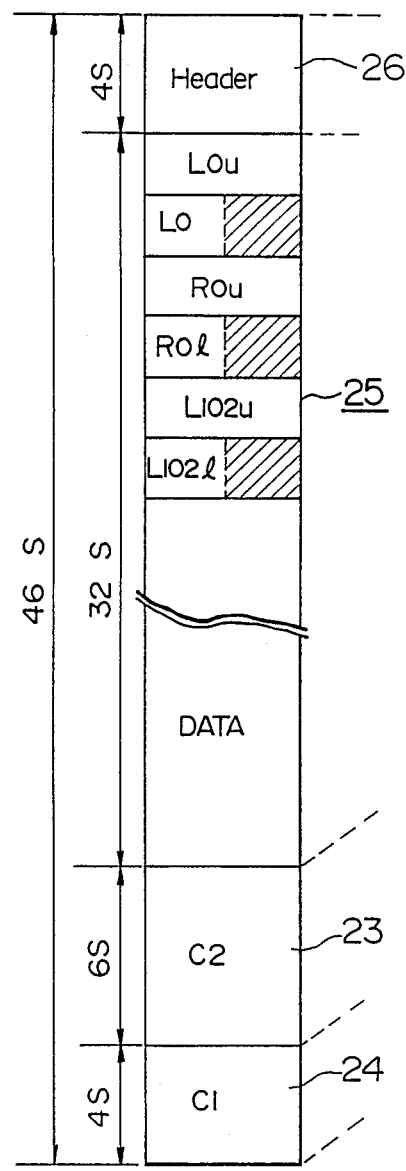
FIGS. 8a and 8b are constituent diagrams showing another embodiment of the data block.
Figure 8B:
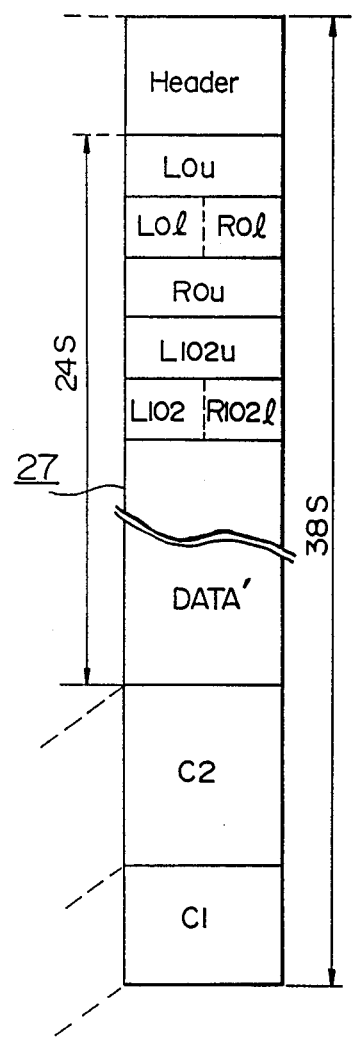

FIG. 8 is a constituent diagram showing conversion of the symbol data configuration for data recording. In FIG. 8, only one block is shown so as to facilitate understanding of the symbol data configuration. In FIG. 8, the diagram (a) shows the block configuration at the output of the signal processing circuit 8, and the diagram (b) shows the block configuration in which the symbol configuration has been changed after deletion of the fixed data of "0". Thus, re-arrangement is made so as to reduce deterioration for every unit symbol. In an actual case, the arrangement can be easily carried out by controlling the address of a RAM storing data of the data frames when the data are read out from the RAM.

Figure 9:
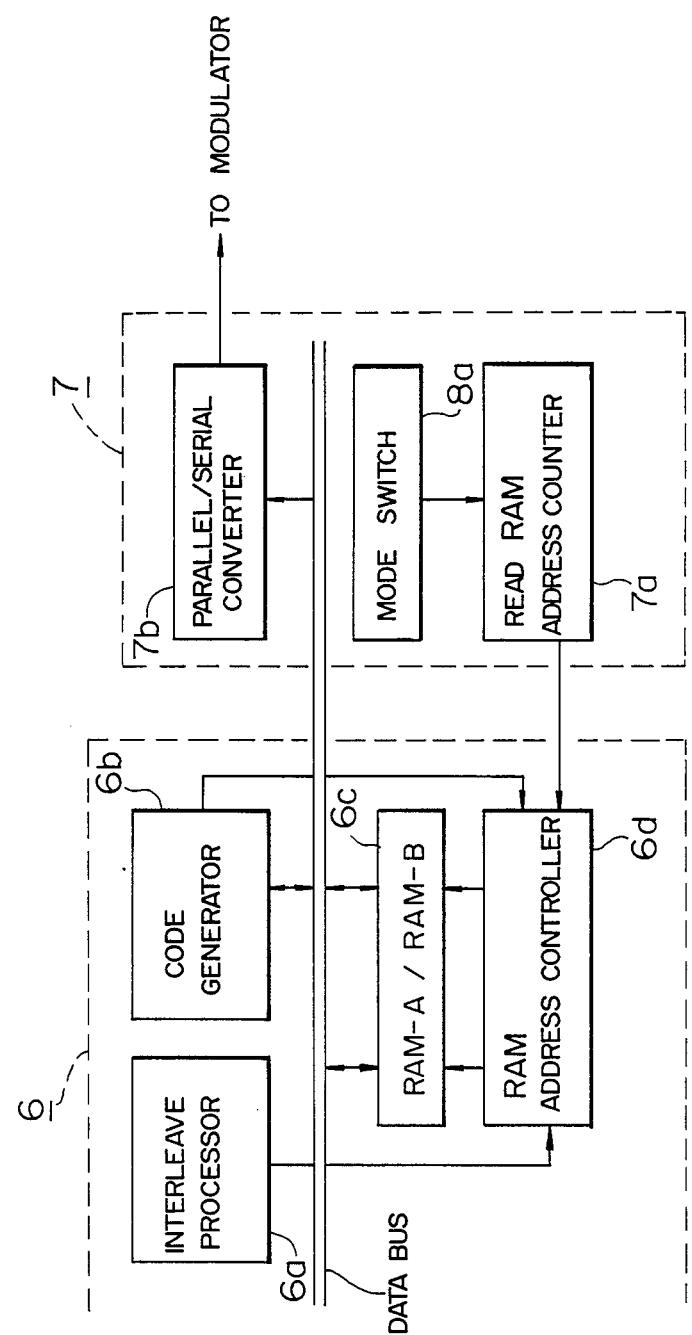
FIG. 9 is a detailed block diagram showing the signal processing circuit and the data deleting circuit.

FIG. 9 is a circuit block diagram showing the details of the data deletion circuit 7 and the signal processing circuit 6. In FIG. 9, the signal processing circuit 6 is constituted by an interleave processing circuit 6a, a code generation circuit 6b, a buffer RAM 6c into which the data frames of FIG. 3 are written, and a RAM address control circuit 6d. The data deletion circuit 7 is constituted by a read RAM address counter 7a, a data parallel-serial converter 7b, and a mode switch 8a.

The operation will now be described. The interleave processing in the signal processing circuit 6 is performed by controlling the RAM address on the buffer RAM 6c which operates on the data-frame basis. The code generation is performed in a manner so that the data in the buffer RAM 6c are read out so as to generate a code which is then written into the buffer RAM. The buffer RAM 6c is constituted by two RAM portions, RAM-A and RAM-B, for two data frames as a whole. If the buffer RAM 6c is arranged so that while one of the two RAM portions is performing code generation or the like, the other RAM portion outputs data successively, the two RAM portions of the buffer RAM 6c can perform a seesaw operation. In the data deletion circuit 7, the serial data is sent to a modulator 52 through a data bus connected to the buffer RAM 6c and through the parallel-serial converter 7b. At this time, the read RAM address counter 7a indicates the address for selecting the data in the buffer RAM 6c. In the mode B, the fixed data can be deleted by making the counter 7a skip the address of the fixed data. The selection of deletion or non-deletion of the data is controlled by the mode switch 8a which corresponds to the switch 8.

In this embodiment, as seen from FIG. 8, the length of one block is 46 symbols before recording and is made to be 38 symbols in recording, so that the recording rate in the mode B can be lowered to 83% of that in the mode A. There is a remarkable advantage in that the circuits for performing interleave, code generation, etc. which are the most important operation in the PCM signal processing, can be used commonly for modes A and B.

Further, since no other symbol data are included in the 8 bits of each symbol data of the block (a), error propagation never occurs in the block (c) in which the fixed data have been deleted.

Comparing the respective recording blocks of the modes A and B with each other, it appears that the code length in the mode B is shorter than that in the mode A due to the relation between the number of the symbol data which are the information and the number of codes. The modes A and B are however equal to each other in code length, that is, in capability of error correction processing, in view of signal processing.

Another embodiment of the present invention shown in FIG. 10 will be described hereunder. The circuit block configuration and the fundamental operation thereof are substantially the same as those in the embodiment described above. Those embodiments are however different from each other in data configuration, and the different point will be described. FIG. 10 shows one block in a data frame. That is, in FIG. 10, the diagrams (a) and (b) show one block of a data frame at the output of the signal processing circuit 6 in the modes A and B respectively, and the diagram (c) shows one block of a data frame at the output of the data deletion circuit 7 in the mode B. The embodiment of FIG. 10 is different from FIG. 8 in that in the mode B, the compressed data of 12 bits are made so that in the L channel, upper 8 bits are made to be one symbol and lower 4 bits are made to be one symbol together with 4 bits of "0" data, while in the R channel, upper 4 bits are made to be one symbol together with 4 bits of "0" data and lower 8 bits are made to be one symbol. Also in this embodiment, the recording rate can be lowered after deletion of the fixed data of "0".

Figure 11A:
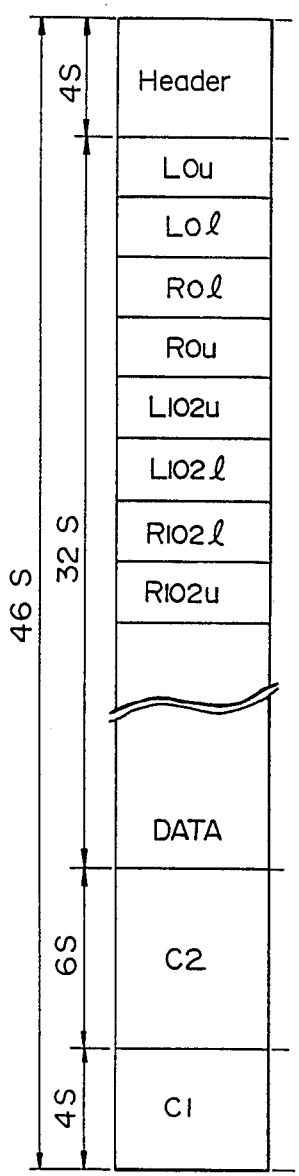
Figure 11B:
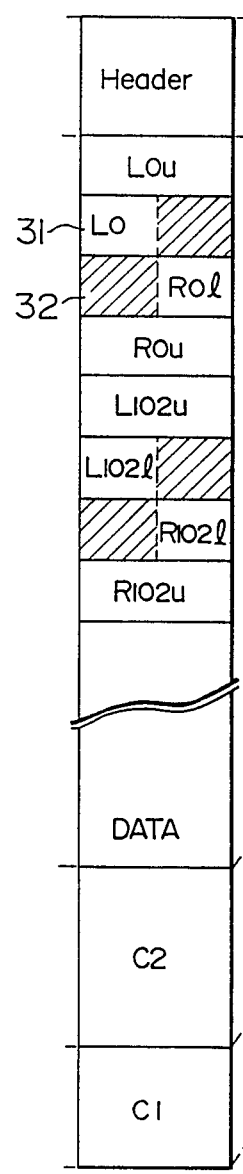

FIG. 11 is a data configuration diagram for explaining a further embodiment of the present invention. This embodiment is different from the FIG. 10 embodiment in that upper and lower bits of the R channel are reversed in the mode B. In order to make the modes A and B common to each other, upper and lower bits the R channel are reversed also in the mode A. The point common to the embodiments of FIGS. 10 and 11 is in that, for example, when data 30 of FIG. 10 is generated in processing of "0" data deletion, it is enough only to add adjacent data 28 and 29 to each other, and similarly to this, when data 33 of FIG. 11 is generated, it is enough to add data 31 and 32 to each other.

Figure 11C:
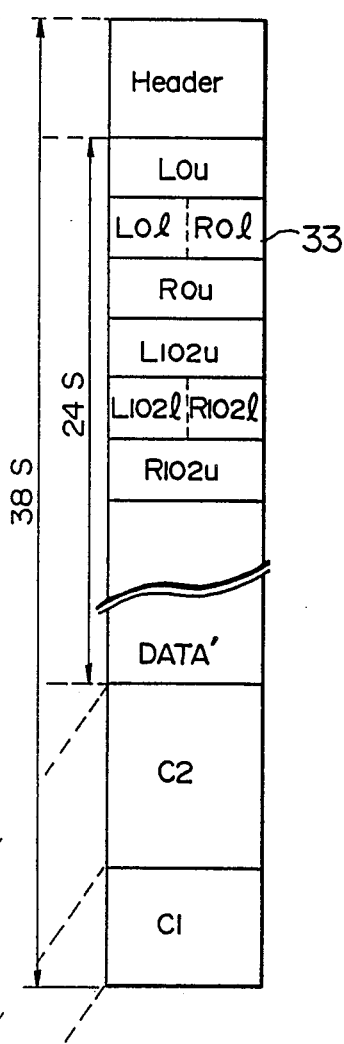

Assume that the data shown in FIG. 11(c) have been subject to group-code modulation on the symbol basis (for example, 8-10 modulation) and recorded on a tape. When an error occurs, for example, in the data 33 in reproduction, it is regarded that the data 31 and the data 32 are erroneous in view of processing of error correction. The processing for eliminating error propagation will be described now. The data block diagram of (b) in FIG. 12 is equivalent to the data block diagram of (b) in FIG. 11. The taking-in of data in generating the intra-block C1 code is performed as follows. First, data 66 ($L_{0\mu}$) is read and fed to an arithmetic circuit provided in the code generation circuit 6b of the signal processing circuit 6. Next, data 67 ($L_{0l}$ + "0") are read, and the "0" data are fed to the arithmetic circuit. Succeedingly, data 68 ("0" + $R_{0l}$) are read, and the addition of the data 67 and 68 ($L_{0l}$ + $R_{0l}$) are fed to the arithmetic circuit. Next, data 69 $R_{0\mu}$) are read and fed to the arithmetic circuit. Thus, upon arithmetically generating the intra-block C1 code, the data configuration becomes as shown in the diagram (b)' of FIG. 12. Thus, if codes are generated by separating the fixed data from the data by symbol, any error never extends to other symbol data in reproduction, so that the error propagation can be prevented. The same processing can be performed also with respect to the inter-block C2 code.

Figure 13:
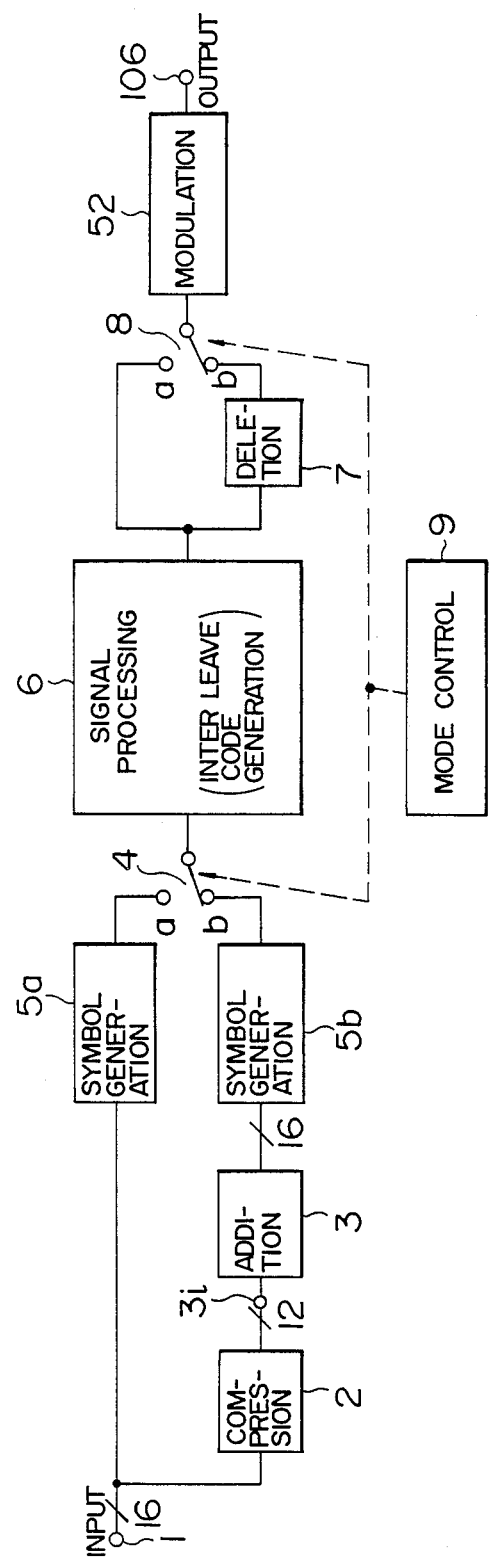
FIG. 13 is a block diagram showing a second embodiment of the PCM signal generating circuit according to the present invention.
Figures 14A, 14B, 14C, 14D:
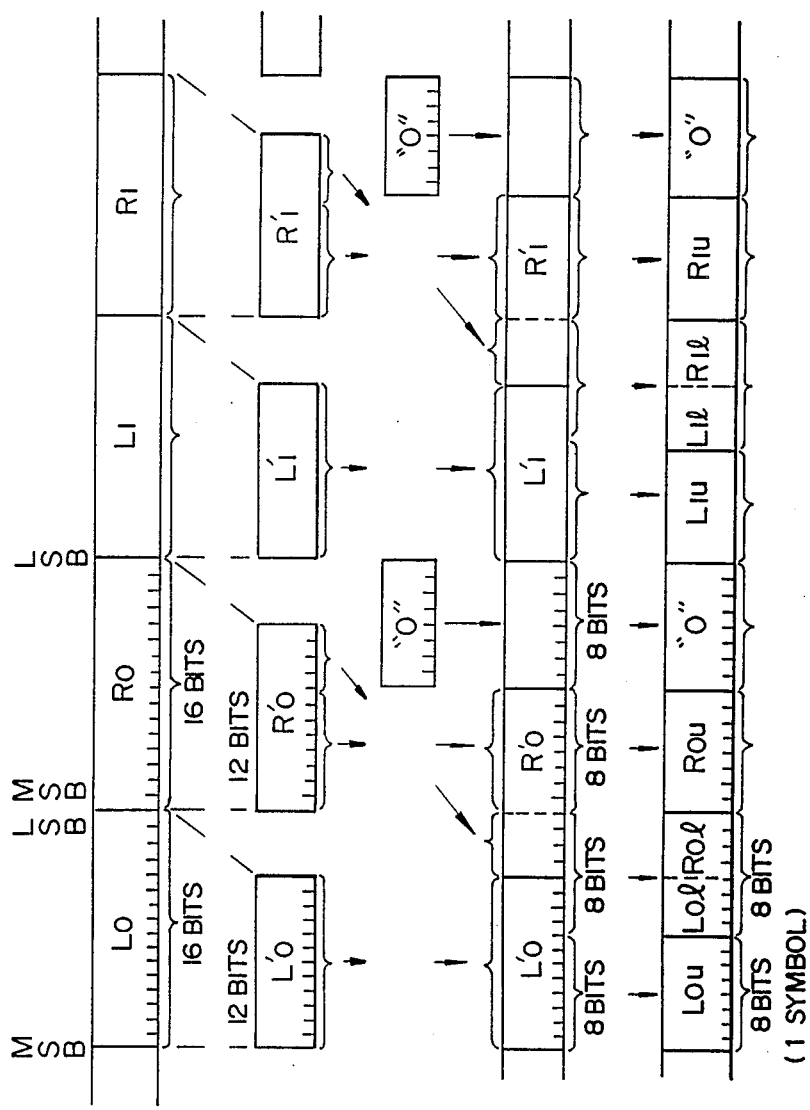
FIGS. 14a–14d are diagrams for explaining generation of symbol data in the circuit of FIG. 13.
Figure 15:
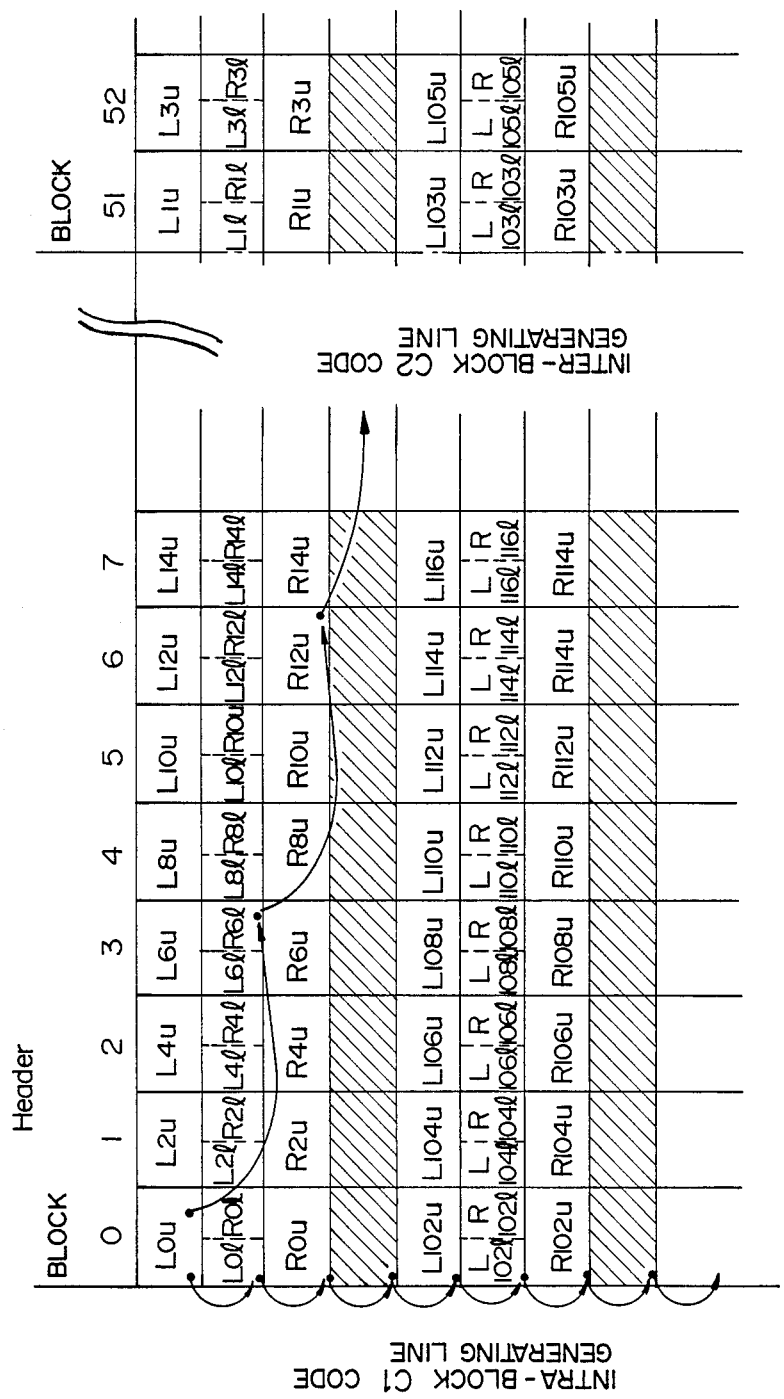
FIG. 15 is a constituent diagram showing a data frame in the circuit of FIG. 13.
Figure 16A:
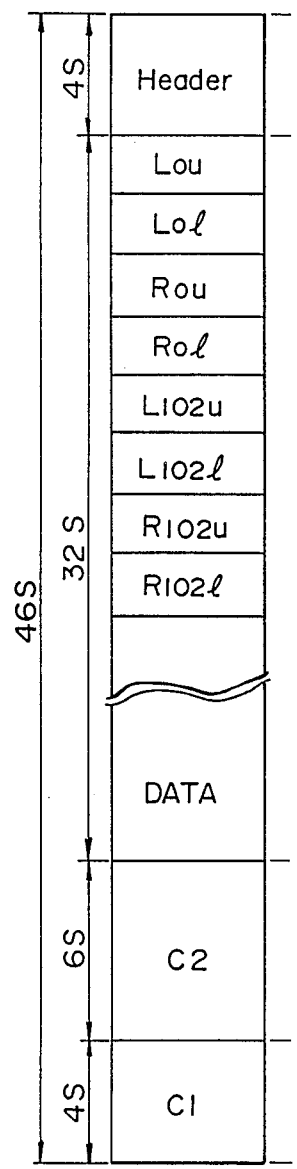
FIGS. 16a, 16b, and 16c are constituent diagrams showing a data block in the data frame of FIG. 15.
Figure 16B:
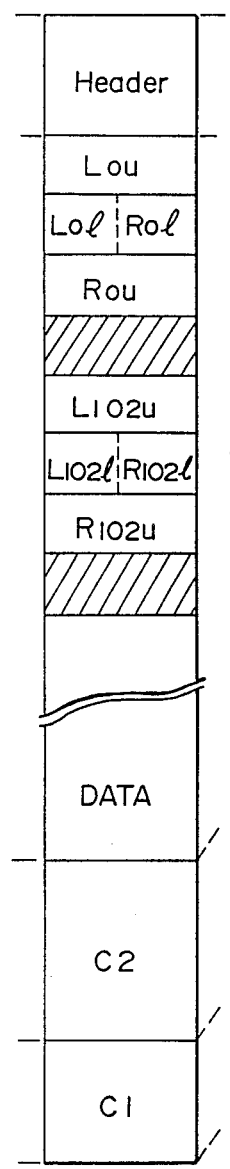
Figure 16C:
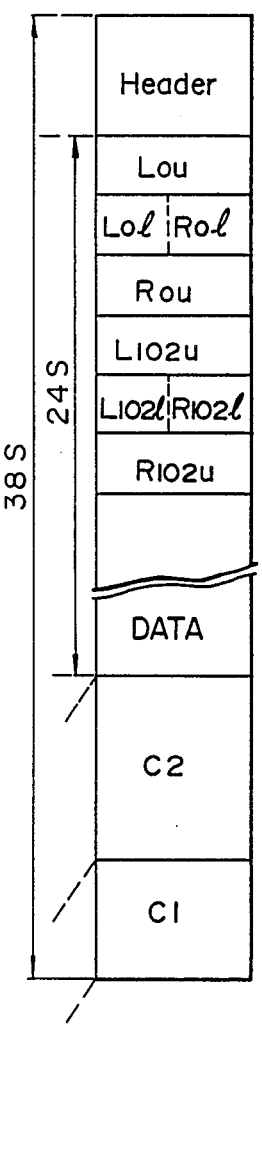

A further embodiment of the present invention will be described hereunder. FIG. 13 is a fundamental circuit block diagram of this embodiment. The fundamental operation in the mode A is the same as that of the embodiments described above. Here, therefore, the particular operation in the mode B in this embodiment will be described. Referring to FIG. 14, the operation of a digital compression circuit 2, a data addition circuit 3, and a symbol data generation circuit 5b are described. In FIG. 14, the diagram (a) shows the input 16-bit/word sample data. The sample data are digital-compressed into 12-bit/word data which are shown in the diagram (b) of FIG. 14. The thus compressed data are subject to the processing of re-arrangement and addition of fixed data in the data addition circuit 3. As shown in the diagram (c) of FIG. 14, the data of the L channel, are left as they are, while in the data of the R channel the lower 4 bits are moved into between the data of the L channel and the upper 8 bits of the R channel. The fixed data composed of, for example, 8 bits of "0" are added after the upper 8 bits of the R channel. The data train (c) are equal to the data train (a) in number of the total bits. In symbol data generation circuit 5b, the data train (c) is converted into symbol data on the 8 bit basis. The thus obtained data train (d) is applied to a signal processing circuit 6 similarly to the case of the mode A. The whole configuration of the data frame B generated in the signal processing circuit 6 is equal to that of the data frame 11 in FIG. 3. However, the inner data configuration becomes as shown in FIG. 15. Comparing the data configuration diagram of FIG. 15 with the data configuration diagram of FIG. 7, it can be seen that the fixed data of "0" are constituted on the symbol basis. The reason why the fixed data of "0" are constituted on the symbol basis is that the fixed data are made independent from other data to thereby prevent error propagation from occurring between symbol data in reproduction in the case where group code modulation on the symbol basis is performed. FIG. 16 shows one block of a data frame in this embodiment. In FIG. 16, the diagram (a) shows the block corresponding to the mode A, the diagram (b) shows the block corresponding to the mode B, and the diagram (c) shows the block in which the fixed data have been deleted in the mode B. The deletion of the fixed data can be easily performed on the symbol basis.

Figure 17:
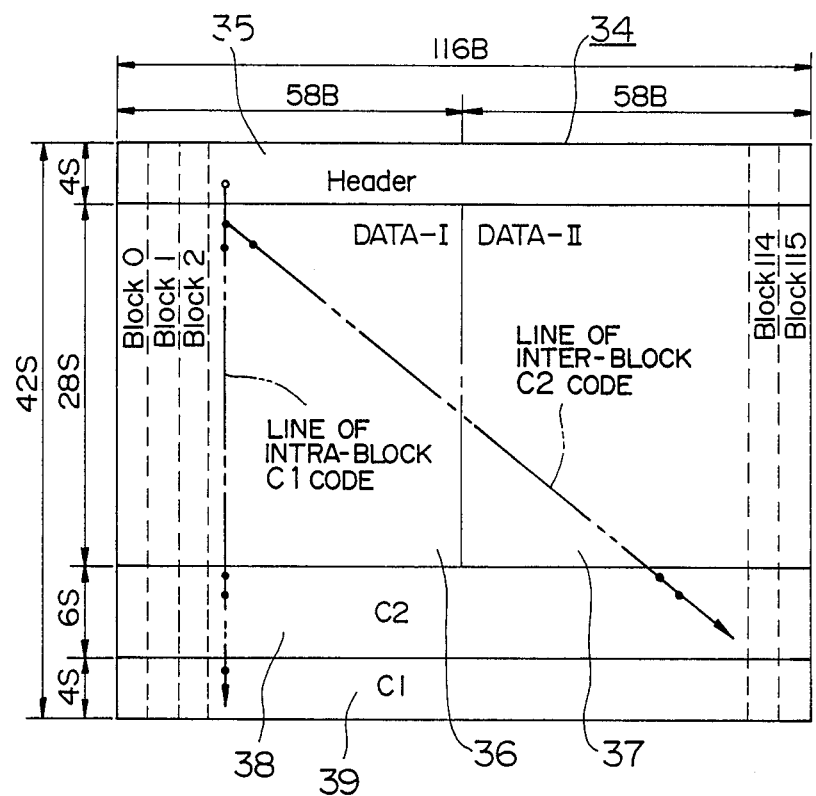
FIG. 17 is a diagram showing another embodiment of the configuration of the data frame.
Figure 18:
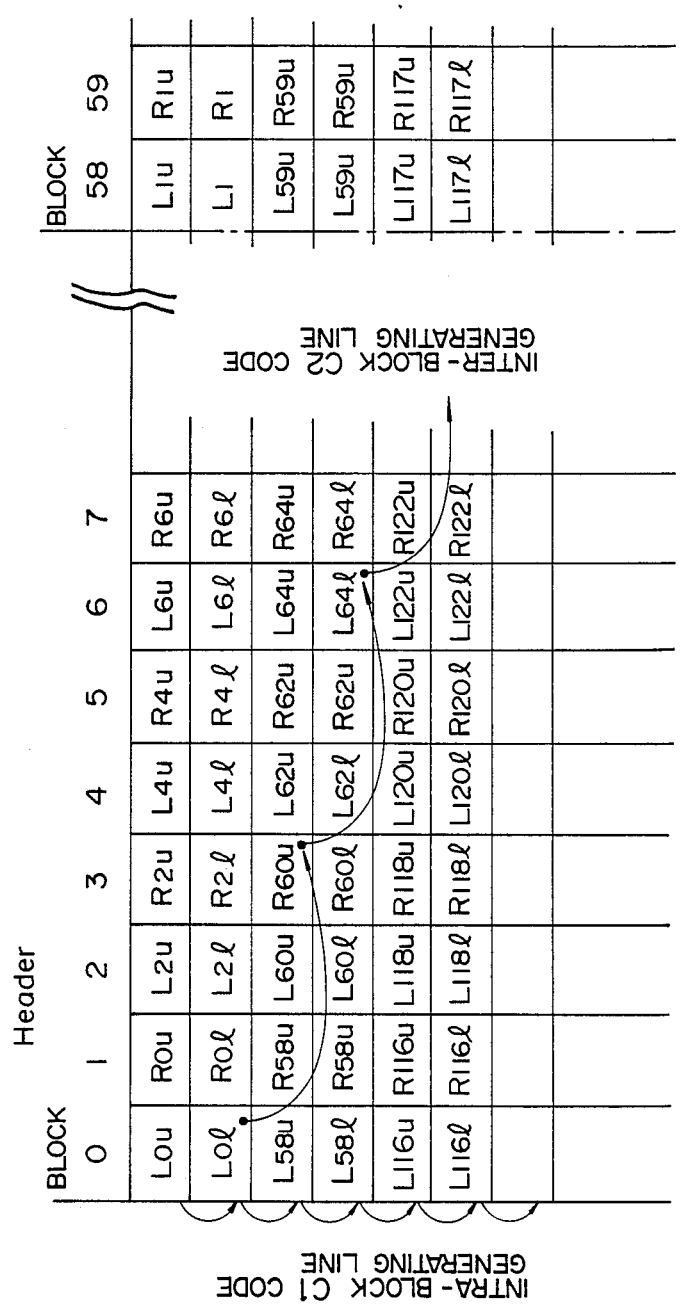
FIG. 18 is a diagram showing a data configuration in the data frame.
Figure 19:
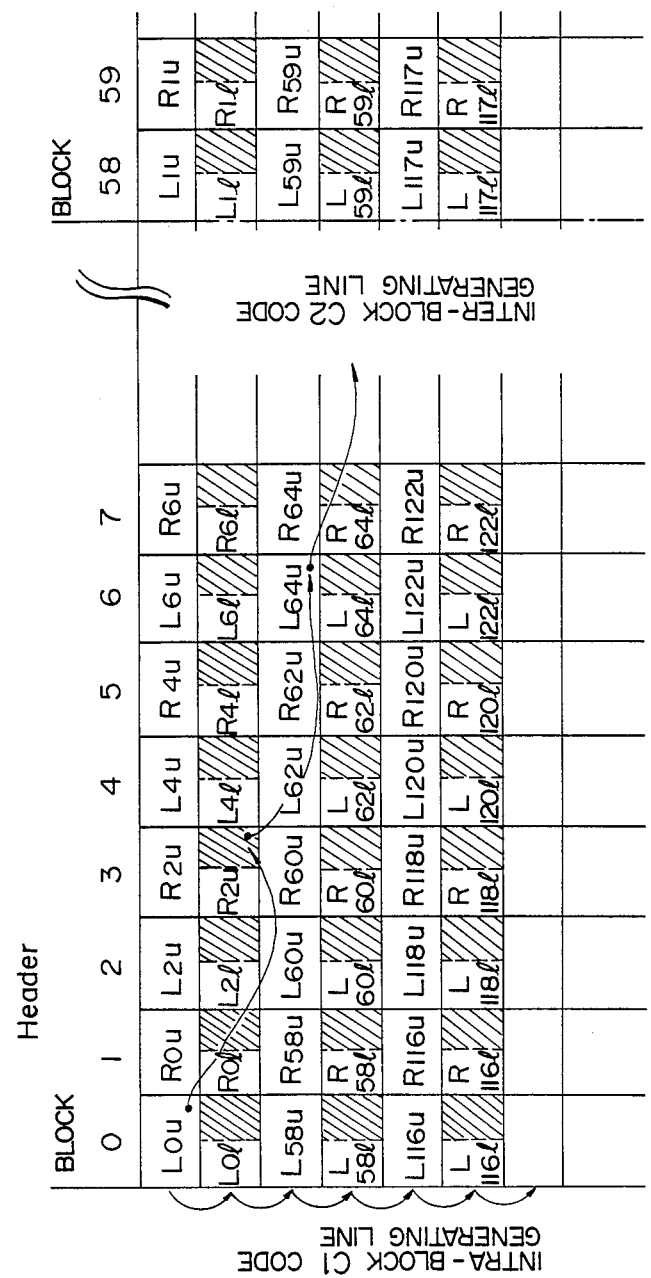
FIGS. 19 and 20 are diagrams showing a data configuration in the data frame in the mode B.
Figure 20:
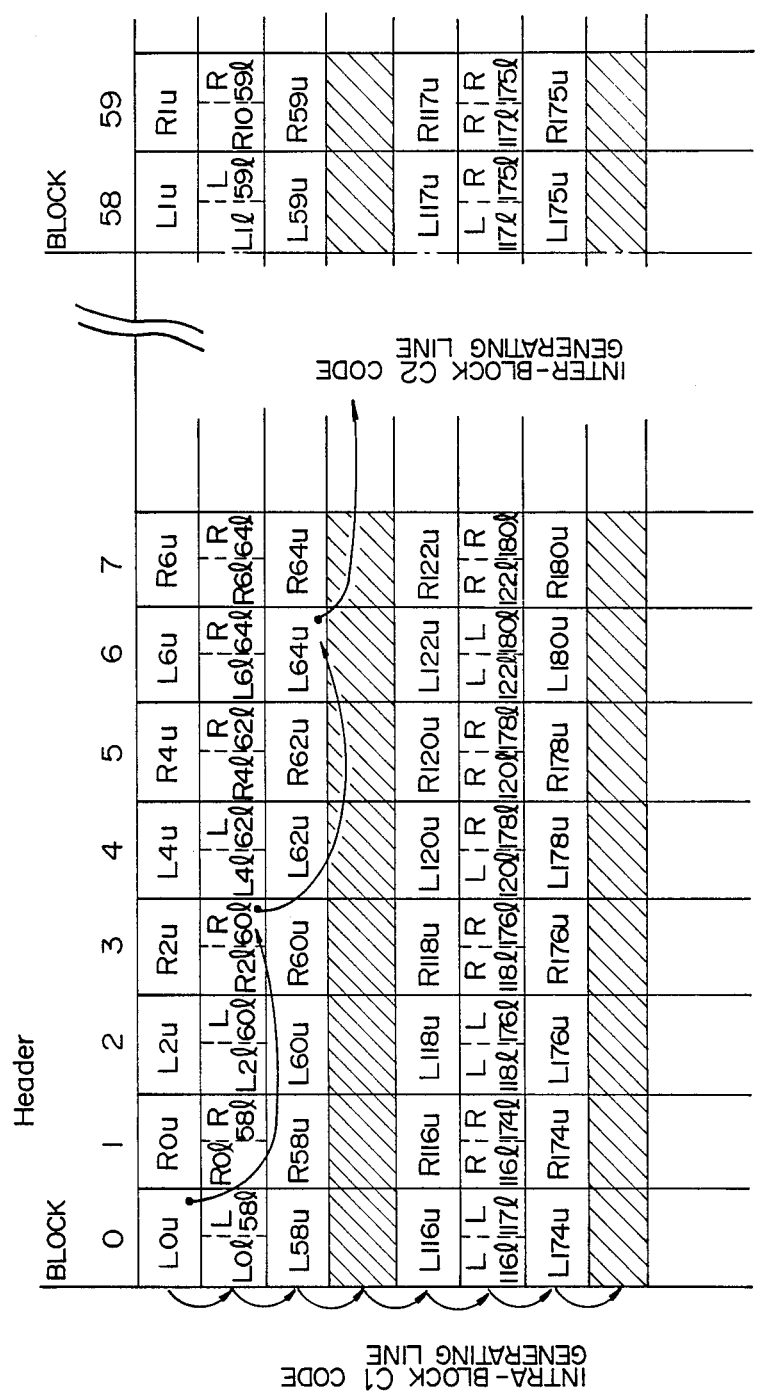

Next, description will be made as to this embodiment with respect to another data frame. FIG. 17 is a constituent diagram showing a data frame generated by the signal processing circuit 6. A data frame 34 is composed of 116 blocks each constituted by 42 symbols. On the basis of the data frame 34, the respective data configurations in the modes A and B are described. The data configuration diagram of FIG. 18 corresponds to the mode A in the embodiment and is remarkably different from the data configuration diagram of FIG. 5 in that each block is composed of only the L-channel data or only the R-channel data. Other than this point, the generation of the C1 and C2 codes are based on the same idea. FIG. 19 is a data configuration diagram which is an example corresponding to the mode B, and which is fundamentally similar to the data configuration diagram of FIG. 7. FIG. 20 is a data configuration diagram which is another example corresponding to the mode B, and which is fundamentally similar to the data configuration diagram of FIG. 15. The above embodiment shows the effect of the present invention in which the signal processing circuit can be made common to the modes A and B and the recording rate can be lowered in the mode B.

Figure 21:
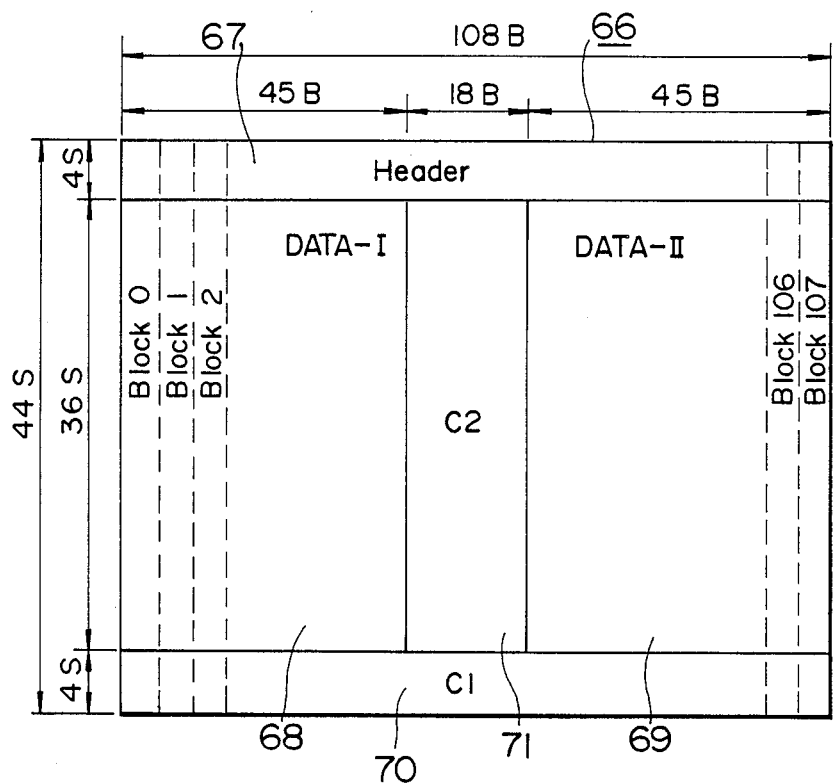
FIG. 21 is a diagram showing a further embodiment of the configuration of the data frame.

Next, an embodiment in which the data frame is of the type of rectangular interleave will be described. FIG. 21 shows an example of the configuration of the data frame of the type of rectangular interleave. A data frame 66 is constituted by a header 67, symbol data 68, symbol data 69, an intra-block C1 code 70, and an inter-block C2 code 71. Each block is composed of 4 symbols of the header and 36 symbols of the data (or 36 symbols of the inter-block C2 code) and 4 symbols of the intra-block C1 code, summing up to 44 symbols. The data frame is constituted by 108 blocks. The configuration of the intra-block C1 code is such that 4 symbols are added as the intra-block C1 code with 36 symbols of data and a block address, summing up to 37 symbols, as information. The code configuration is RS (41, 37, 5). As to the inter-block C2 code, three sets of inter-block C2 codes are generated orthogonally relative to the intra-block C1 code. With the 30 symbols of symbol data as information, the inter-block C2 code is composed of 6 symbols so as to make the code configuration be RS (36, 30, 7).

Figure 22:
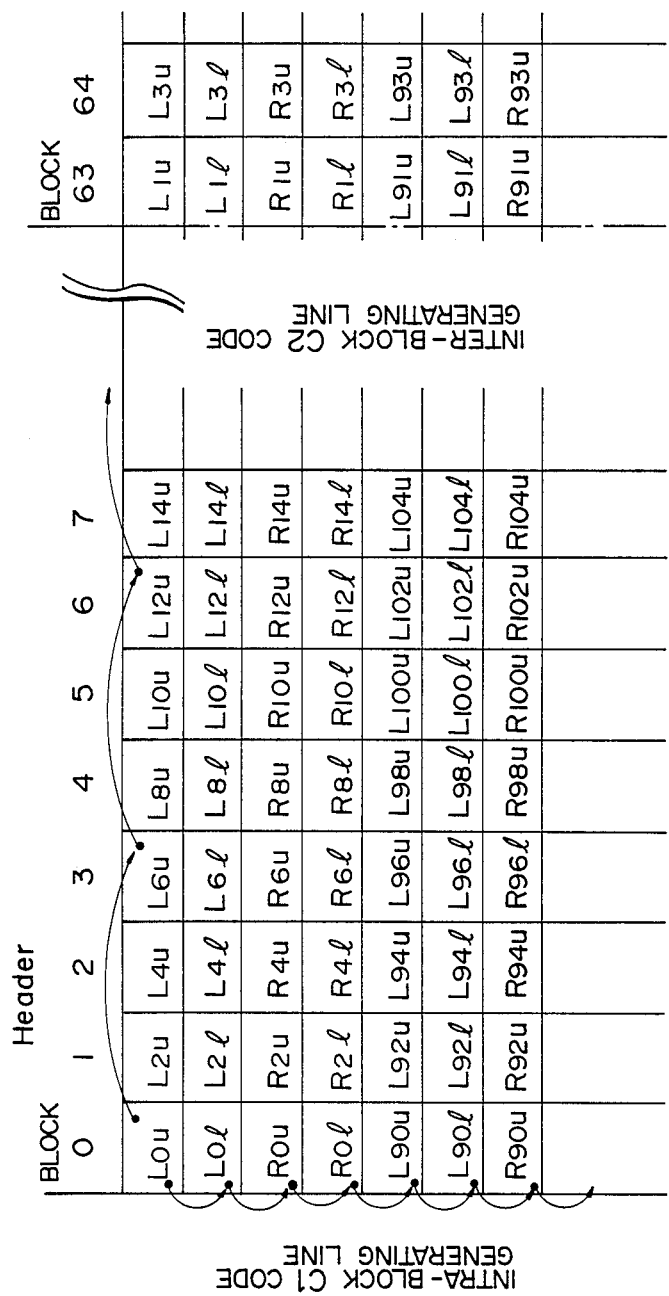
FIG. 22 is a diagram showing a data configuration in the data frame.
Figure 23:
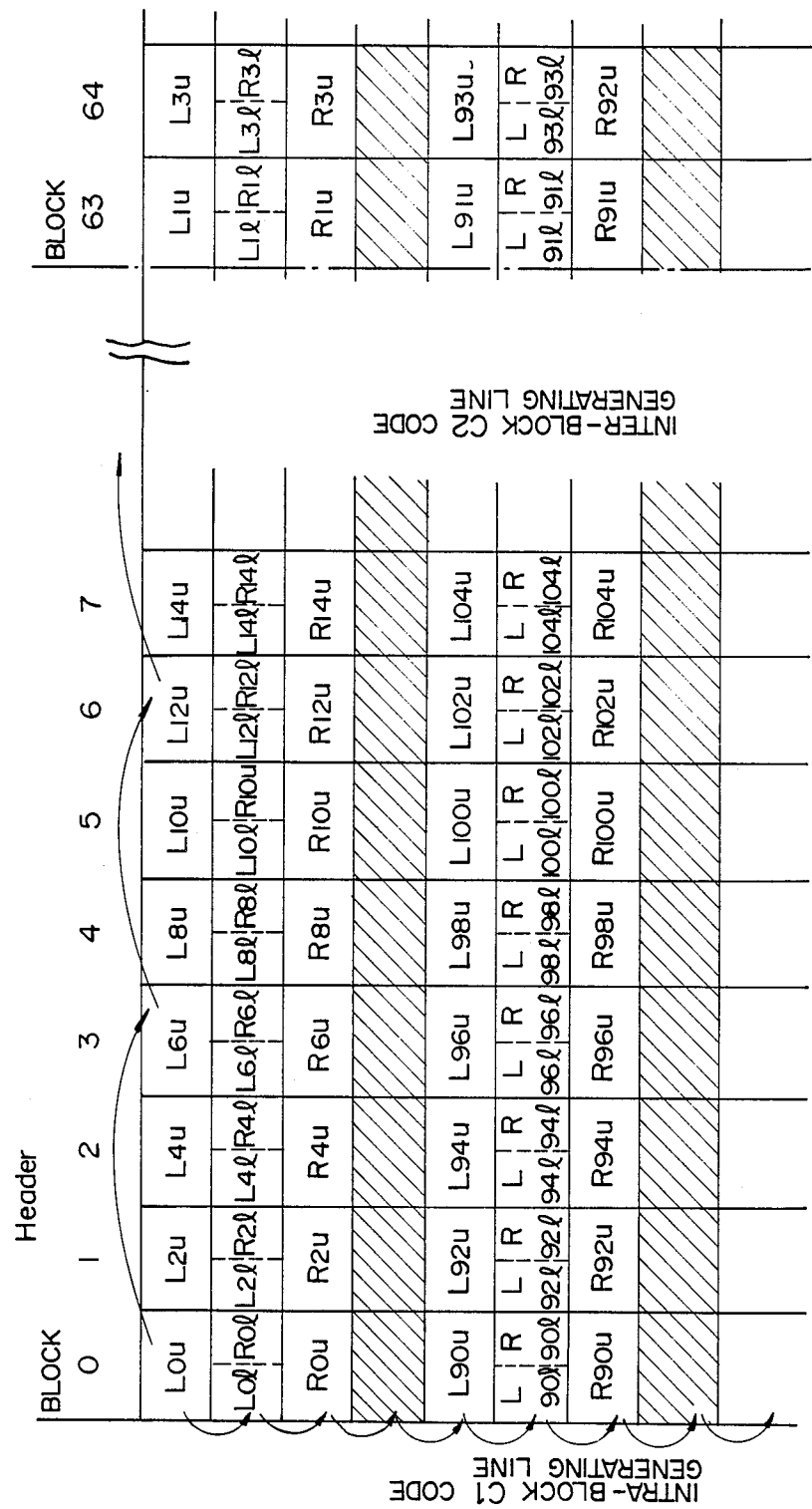
FIG. 23 is a diagram showing a data configuration in the data frame in the mode B.
Figure 24:
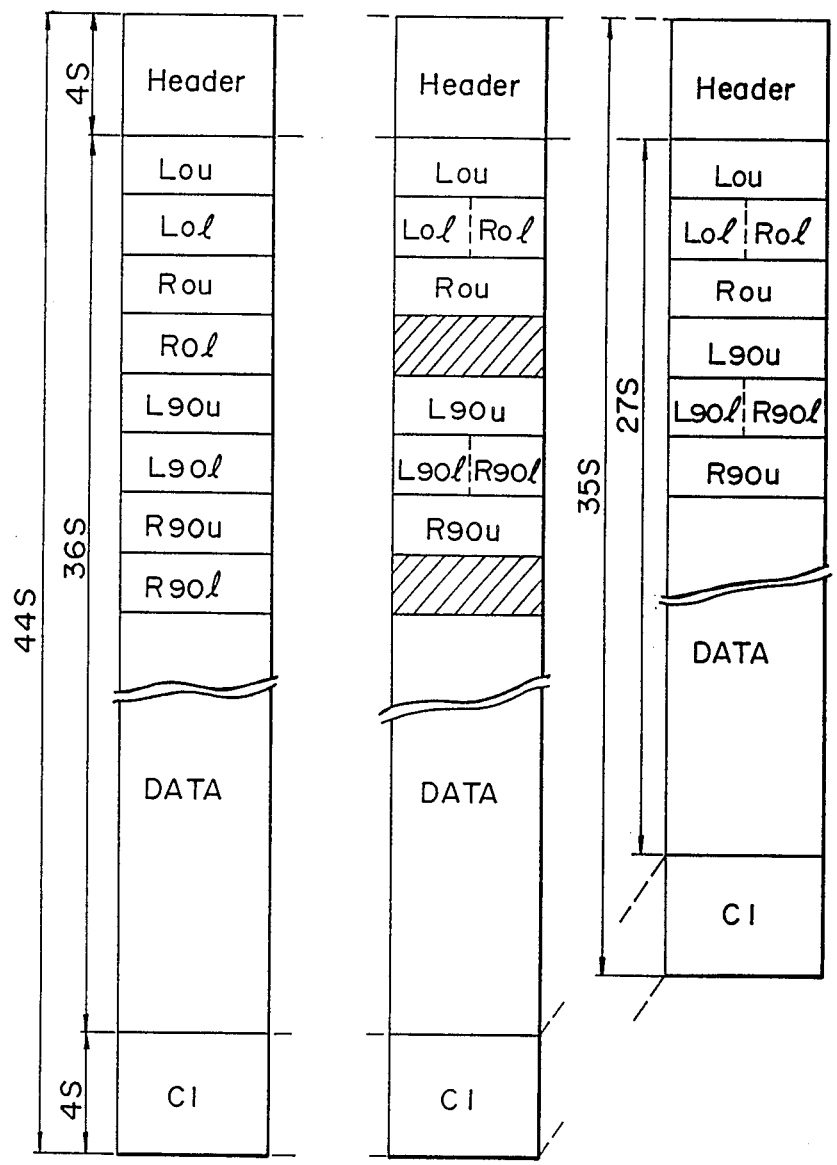
FIGS. 24a, 24b, and 24c are constituent diagrams showing a data block.

A part of the data configuration of the data frame 66 will be described. FIG. 22 shows the data configuration in the mode A. The intra-block C1 code is generated with the symbol data $L_{0\mu}$, $L_{0l}$, $R_{0\mu}$, $R_{0l}$, $L_{90\mu}$, .... (In the case where the block address is added to the information, the order of the symbol data is $A_0$, $L_{0\mu}$, $L_{0l}$, ....) The inter-block C2 code is generated with the horizontal symbol data $L_{0\mu}$, $L_{6\mu}$, $L_{12\mu}$, .... FIG. 23 shows the data configuration in the mode B. Although fixed data of "0" have been added to every 4 symbol data by the symbol generating circuit 56, the data configuration of FIG. 23 is fundamentally the same as that of FIG. 22. The intra-block C1 code is generated so that the fixed data of "0" are included therein. The inter-block C2 code is generated only with the "0" data at every fourth row. The inter-block C2 code generated at every four rows is deleted together with the "0" data at the time of recording. FIG. 24 shows blocks in the modes A and B respectively. That is, in FIG. 24, the diagram (a) shows a block in the mode A and the diagram (b) shows a block in the mode B including fixed data of "0" which will be deleted at the time of recording as shown in the diagram (c). Being not shown in the drawing, the inter-block C2 code generated with fixed data in the block including the inter-block C2 code is also deleted at the time of recording.

As described above, if fixed data are added on the symbol basis, it is possible to control the quantity of recording information (recording rate control) with a signal processing circuit made common to the respective data frames of the diagonal interleave and the rectangular interleave. There is a further advantage that no error propagation is caused.

Figure 25:
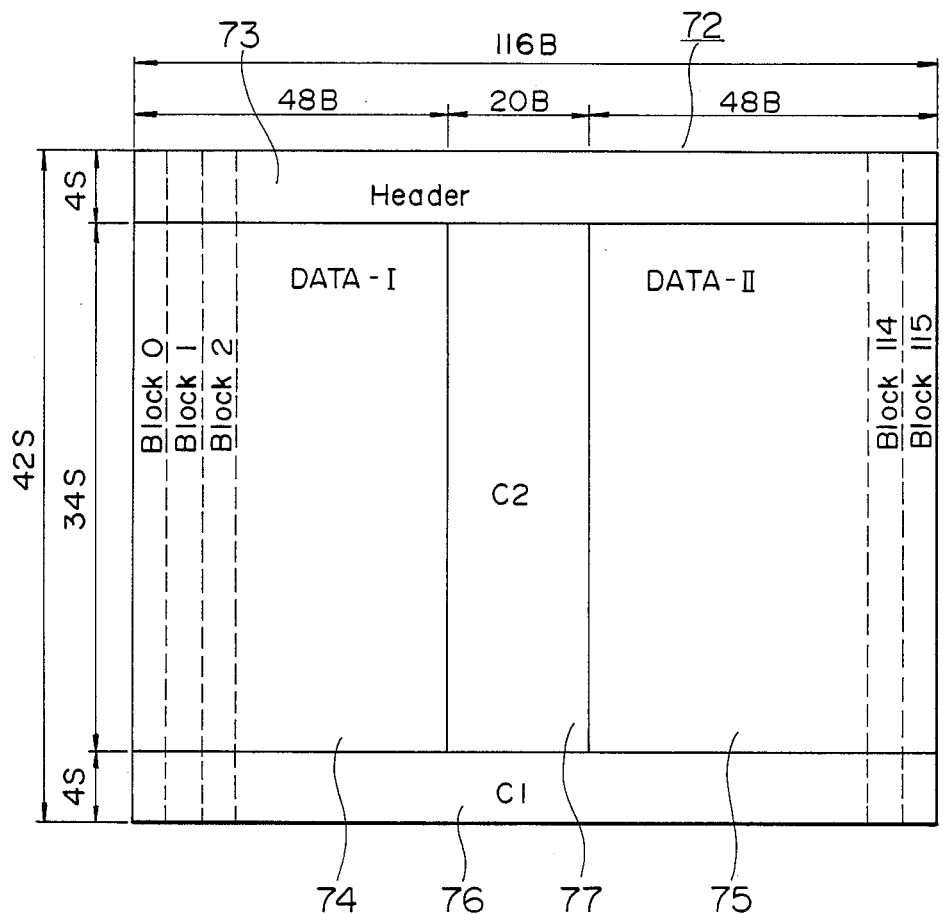
FIG. 25 is a constituent diagram showing a further embodiment of the data frame in the rectangular interleave system.

Next, description will be made about an embodiment of the present invention in which fixed data are inserted so that the fixed data are arranged on the block basis in the rectangular interleave system. The number of blocks can be reduced by deleting the fixed data. FIG. 25 is a constituent diagram showing a data frame of the rectangular interleave. A data frame 72 is composed of 116 blocks. Referring to FIG. 26, the symbol data configuration in the data frame 72 is described. FIG. 26 shows the symbol data configuration in the mode A. The intra-block C1 code is generated together with the symbol data $L_{0\mu}$, $L_{24\mu}$, $L_{48\mu}$, ... as information. The inter-block C2 code is generated at every 4 symbols (4 blocks) in horizontal direction with the symbol data $L_{0\mu}$, $L_{2\mu}$, $L_{4\mu}$, ... as information. Four kinds of inter-block C2 codes are generated by shifting the jump of 4 symbols.

Figure 27:
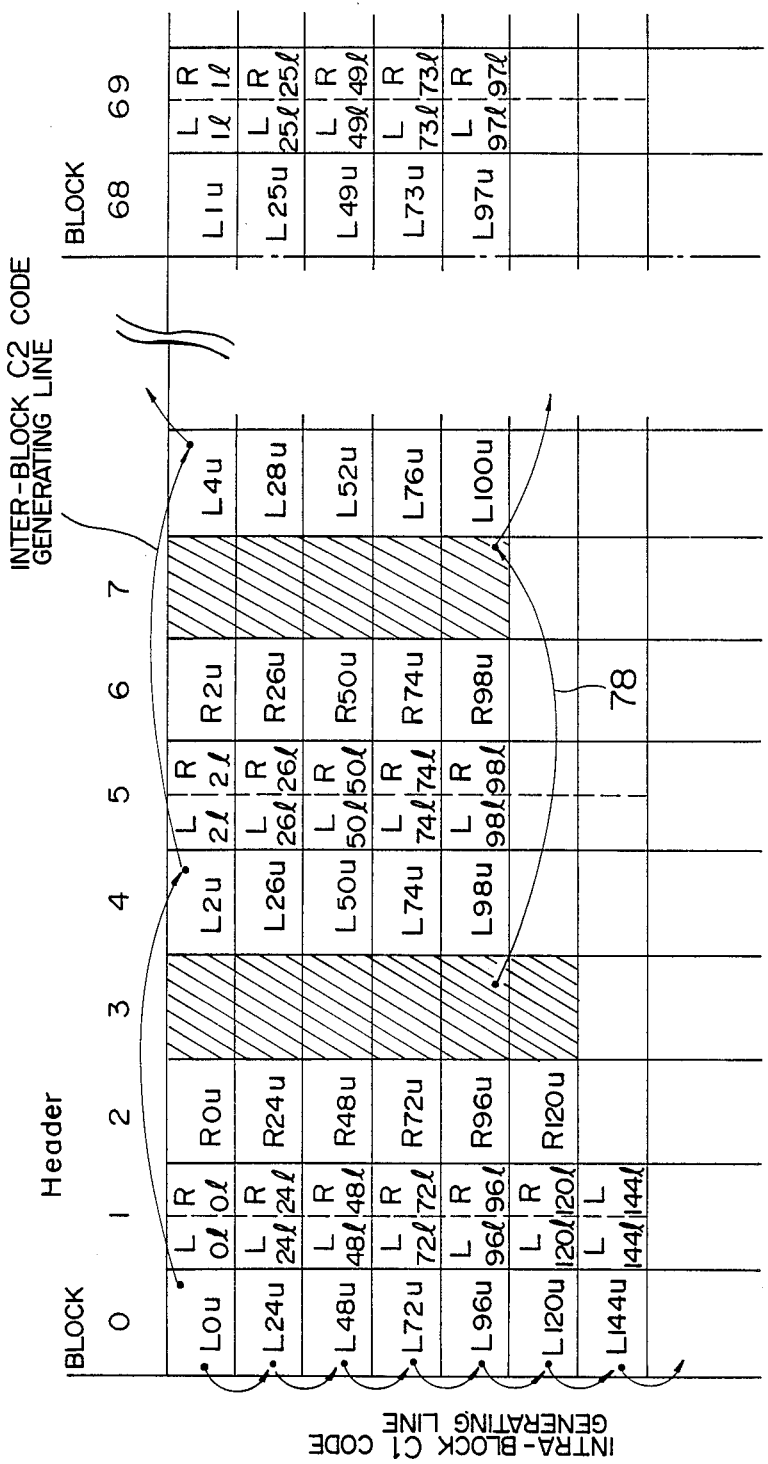
Figure 28:
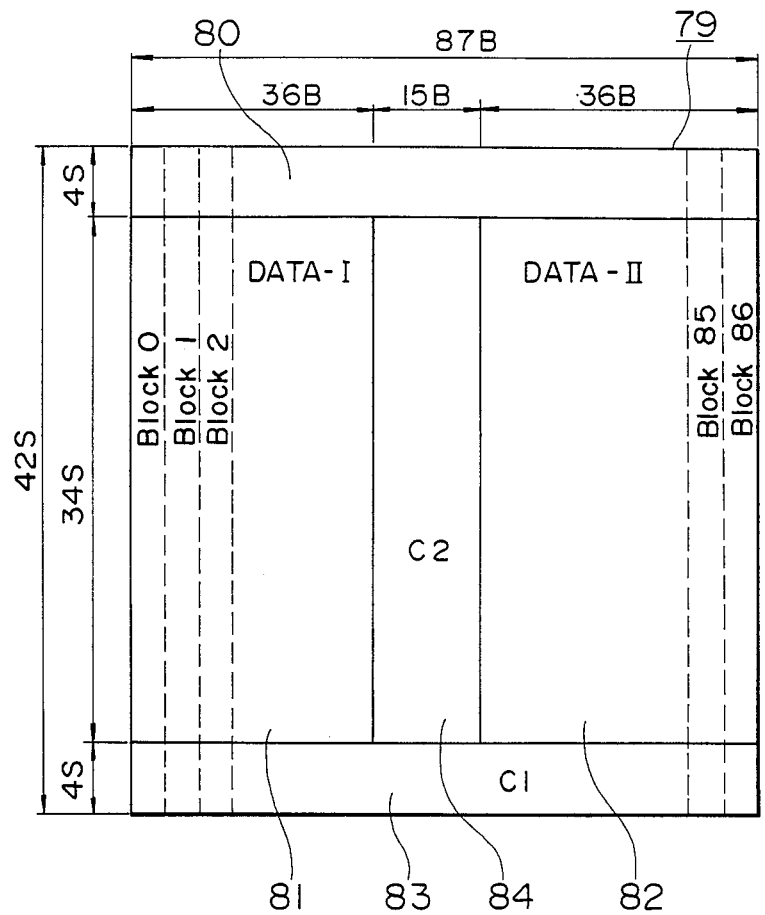
FIG. 28 is a constituent diagram showing a still further embodiment of the data frame in the rectangular interleave system.

Next, the symbol data configuration in the mode B is shown in FIG. 27. As shown in the drawing, fixed data on the one symbol basis are arranged at every four blocks. The inter-block C2 codes are generated along the line 78 only with the fixed data as information. The recording rate can be lowered by deleting all the blocks containing the fixed data, after generation of frame data. Since the header portion such as a synchronizing signal, and the intra-block C1 code can be deleted simultaneously with the deletion of the block containing the fixed data, the recording rate can be simply reduced to ¾. FIG. 28 shows the data frame in the mode B at the time of recording. Horizontally, that is, in view of the number of blocks, the blocks can be reduced to 87 in the mode B relative to 116 blocks in the mode A, so that in the mode B, the transmission rate (recording rate) can be lowered to ¾ of that in the mode A.

Figure 29:
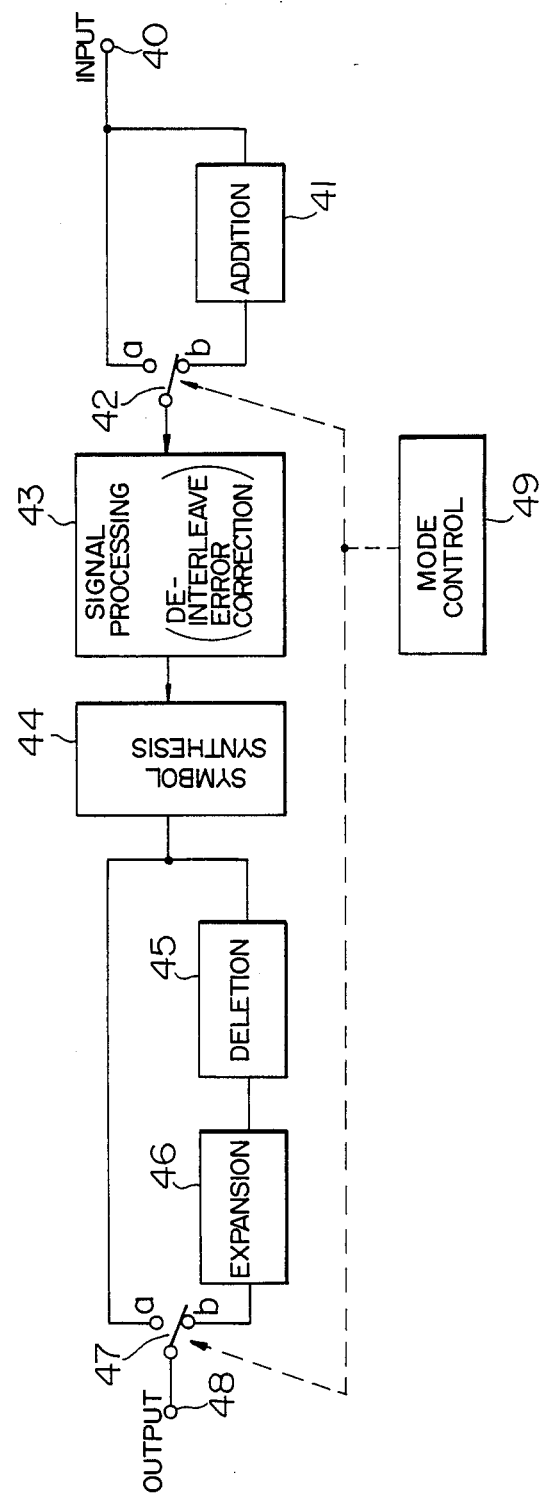
FIG. 29 is a block diagram showing an embodiment of the PCM signal reproducing circuit according to the present invention.

Next, description will be made about a PCM data reproducing circuit for reproducing the original signal from a magnetic tape on which a signal generated in the PCM data generating circuit according to the present invention has been recorded. FIG. 29 is a block diagram showing an embodiment of the PCM data reproducing circuit. The PCM data reproducing circuit is constituted by a data input terminal 40, a data addition circuit 41, switches 42 and 47, a signal processing circuit 43, a data deletion circuit 45, a digital expansion circuit 46, a mode control circuit 49, and a data output terminal 48. This PCM reproducing circuit operates fundamentally in the manner reverse to the PCM data generating circuit of FIG. 1. Each of the switches 42 and 47 is connected to the contact a side in the mode A, while the contact b side in the mode B. In the mode A, input data (a data frame A) are fed to the signal processing circuit 43 so as to be subject to de-interleave processing, error correction processing, and so on, so that data are reproduced on the symbol basis. The symbol data are converted in the symbol data synthesizing circuit 44 into a 16-bit sample data. The sample data are put out from the data output terminal 48 through the switch 47. In the mode B, the fixed data which have been deleted at the recording side are added to the input data (the data frame B) in the data addition circuit 41. The output data of the data addition circuit 41 is applied to the signal processing circuit 43 through the switch 42, and, similarly to the case of the mode A, subject to de-interleave processing, error correction processing, and so on, to thereby reproduce the symbol data. The thus reproduced symbol data are converted into 16-bit sample data by the symbol data synthesizing circuit 44. The sample data are processed in the data deletion circuit 45 so that the fixed data contained in the data are deleted. The output signal of the data deletion circuit 45 is subject to digital expansion to thereby obtain 16-bit sample data which are put out from the data output terminal 48 through the switch 47. Thus, the PCM data generated in the PCM data generating circuit of FIG. 1 can be processed by the PCM reproducing circuit of FIG. 29 so as to obtain the original signal.

Figure 30:
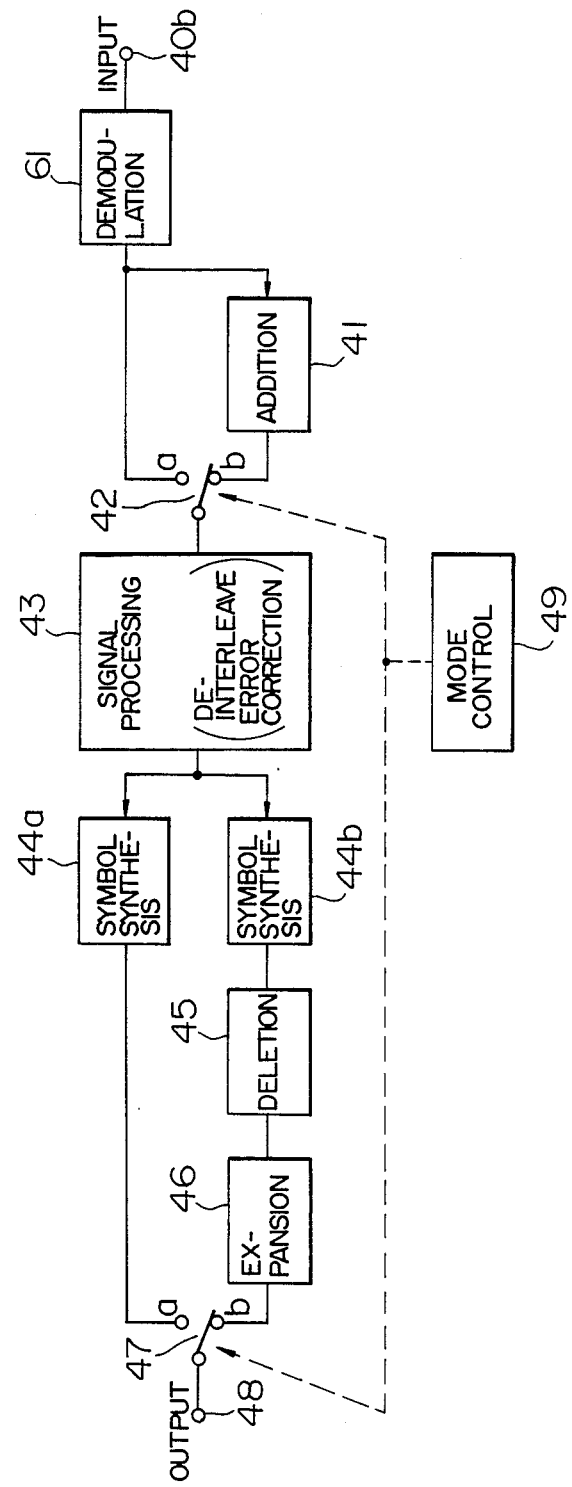
FIG. 30 is a block diagram showing another embodiment of the PCM signal reproducing circuit according to the present invention.

FIG. 30 is a block diagram showing another embodiment of the PCM reproducing circuit, which is similar to that shown in FIG. 29. The PCM reproducing circuit of FIG. 30 corresponds to the PCM data generating circuit of FIG. 13. The detailed description about this embodiment is omitted here.

Figure 31:
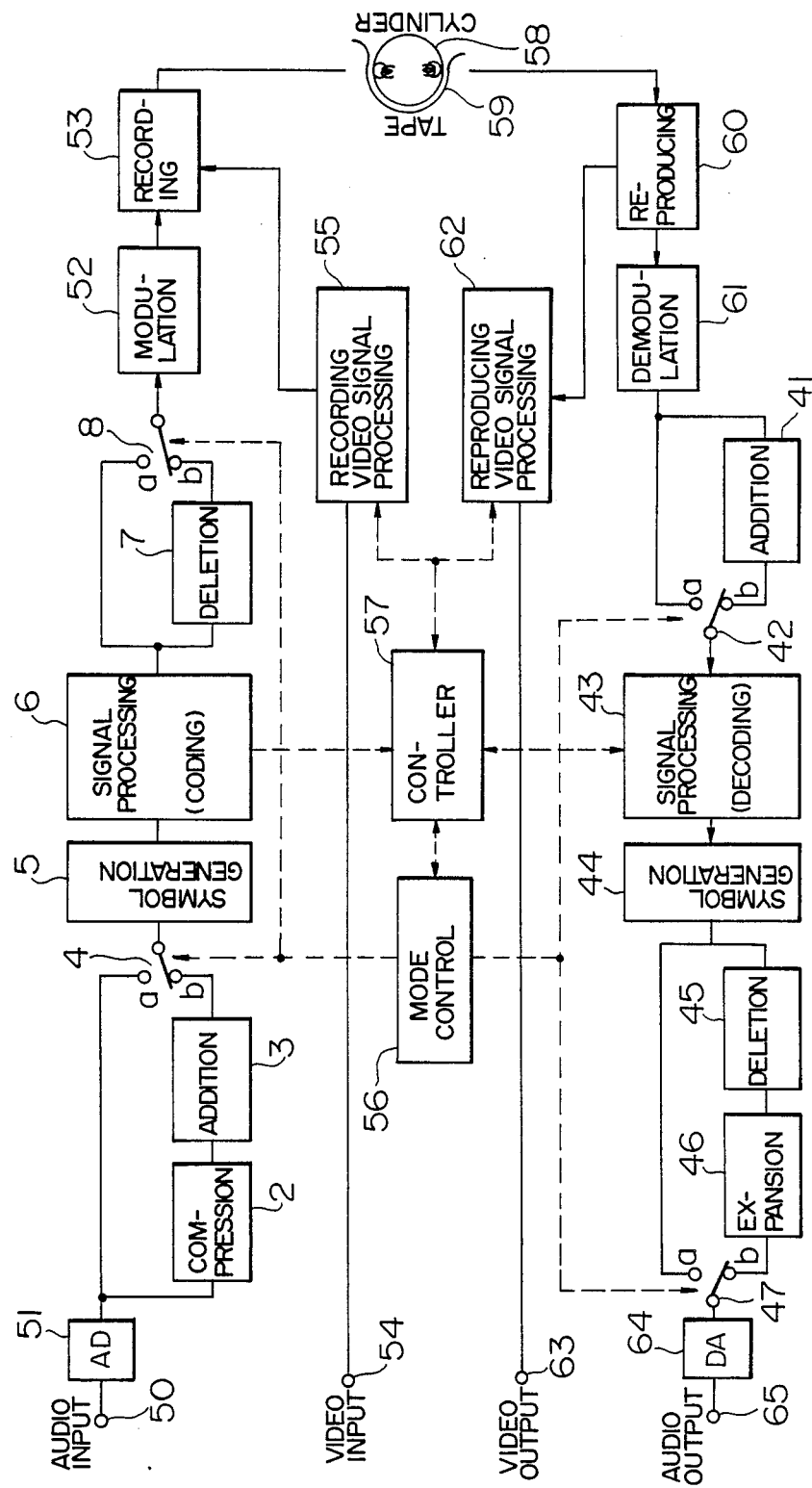
FIG. 31 is a block diagram showing an embodiment of the PCM signal recording/reproducing apparatus according to the present invention.

Next, description will be made about an application of the PCM data generating circuit and the PCM reproducing circuit according to the present invention. FIG. 31 is a circuit block diagram showing the case where the present invention is applied to a PCM voice recording-/reproducing circuit of an 8 mm VTR.

In an 8 mm VTR, a PCM voice track is provided on an extension of a video track on a tape. The voice track is used to perform recording/reproducing PCM voice data. The circuit of FIG. 31 is constituted by use of the circuits of FIGS. 1 and 29 and by additionally providing a video signal recording/reproducing circuit. The circuits designated with the same reference numeral performs the same operation. The elements newly provided includes an analog audio input terminal 50, an analog-to-digital converter 51, a modulation circuit 52, a recording amplifier 53, a video signal input terminal 54, a video signal processing circuit 55 for recording, a mode control circuit 56, a system controller 57, a rotary cylinder 58 having a head, a magnetic tape 59, a reproducing amplifier 60, a demodulation circuit 61, a video signal processing circuit 62 for reproducing, a video signal output terminal 63, a digital-to-analog converter 64, and an analog audio output terminal 65. Although the operation of this circuit of FIG. 31 is not described in detail, the circuit of FIG. 31 has features in that recording/reproducing is performed by area-dividing a video signal and a PCM audio signal on a tape and in that the present invention is used in the PCM audio signal recording/reproducing portion. The configuration when the present invention is used in an 8 mm VTR will be described hereunder.

In PCM audio recording in an 8 mm VTR, in the case where information is recorded on a tape in a stereo mode under the condition that the audio sampling frequency is 48 kHz and the number of quantization bits is 16, the number of sample data per track is about 1600, that is, the number of symbols per track is about 3200. Since the number of symbol data of the data frame 11 shown in FIG. 3 is 3236 symbols, this number is suitable. If this data frame is to be recorded in the PCM data recording area (26.32°) in an 8 mm VTR, however, the line recording density at the area becomes about 104 kBPI, and this value is not a practical level in view of the performance of a tape. If the PCM data recording area is increased by 5° to 31.32°, the line recording density is lowered to about 87 kBPI which is a practical level when a metal evaporation (ME) tape is used. The line recording density is not yet a practical level for a present metal particles (MP) tape. Accordingly, if the sample data quantized with 16 bits are subject to digital compression into 12-bit data, the compressed 12-bit data correspond to the above-mentioned mode B. In this mode B, if, for example, the number of symbols in a block is reduced the line recording density becomes about 72 kBPI, and if the number of blocks is reduced as in FIG. 28, the line recording density becomes about 68 kBPI, so that the numerical value of the line recording density approaches a practical level for an MP tape. Thus, the modes A and B may be made to correspond to an ME tape and an MP tape respectively. Thus, the PCM data generating circuit according to the present invention has advantages in that the signal processing circuit can be made common to the modes A and B and even in the case where the circuit configuration is made so that the mode can be changed over, the configuration does not become so complicated. The mode may be changed over automatically by use of identification hole of a cassette for discriminating ME and MP tapes from each other.

An MP-HG tape, in which the performance of an MP tape is improved, can be made to correspond to the mode A. An 8 mm VTR has two speed modes, that is, an SP mode which is a standard recording mode and an LP mode which is a long time recording mode, so that the running speed of a tape can be changed over. Accordingly, depending on the tape running speed, the pitch of recording tracks changes and the S/N ratio of a reproducing signal changes. The pitch is 20.5 $\mu$m in the SP mode and 10.25 $\mu$m in the LP mode. One and the same head having a width of 15 $\mu$m is used commonly to the SP and LP modes, the track width is 15 $\mu$m in the SP mode and 10.25 $\mu$m in the LP mode. At this time, the difference in S/N ratio is about 3 dB. That is, the S/N ratio in the reproducing operation changes between the SP and LP modes. Accordingly, if the SP and LP modes are made to correspond to the modes A and B according to the present invention respectively, the system matching property is preferable.

Figure 32:
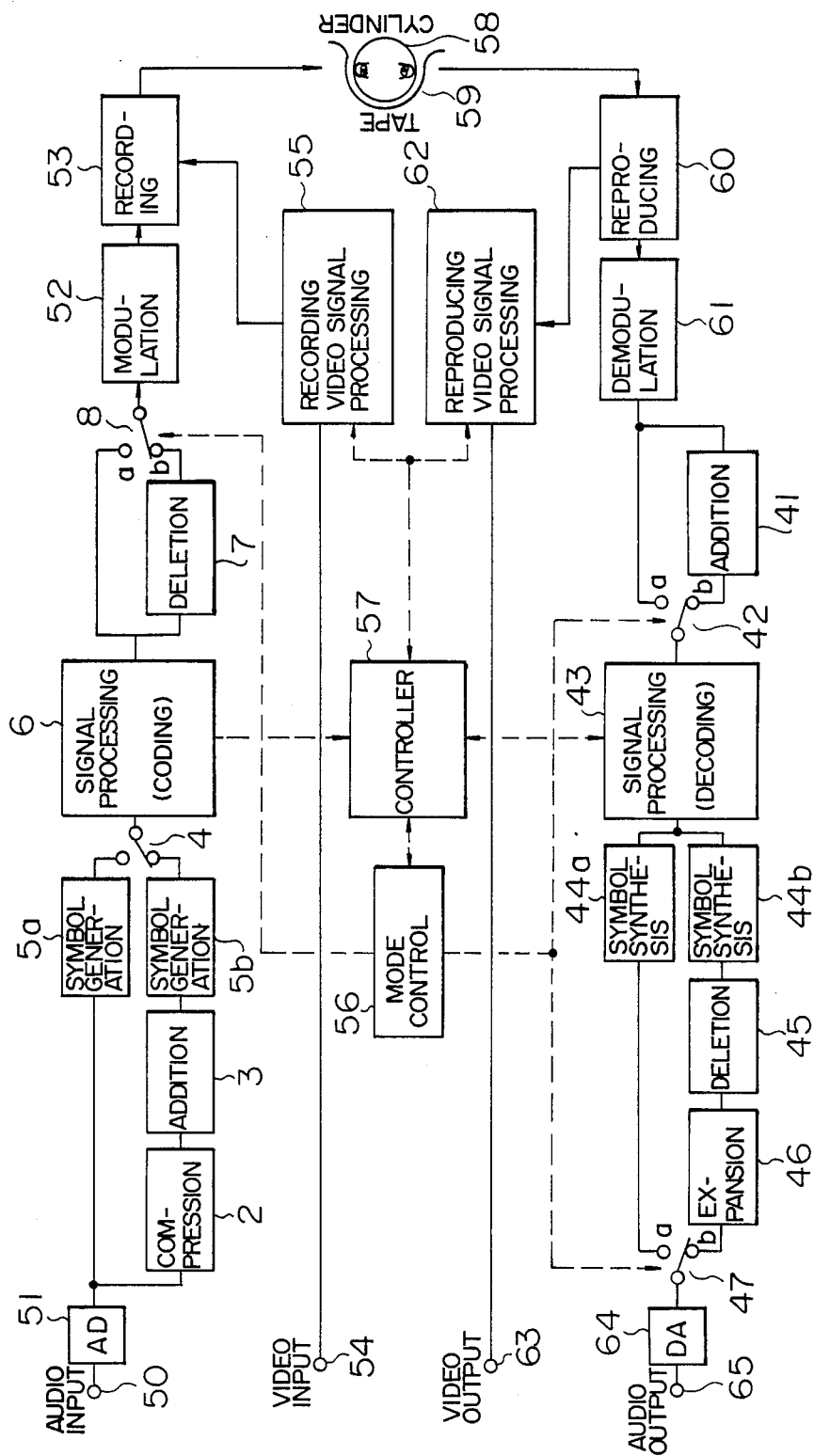
FIG. 32 is a block diagram showing another embodiment of the PCM signal recording/reproducing apparatus according to the present invention.

Next, FIG. 32 is a circuit block diagram showing another case where the present invention is applied to a PCM audio recording/reproducing circuit of an 8 mm VTR, similarly to the case of FIG. 31. The circuit of FIG. 32 is constituted by use of the circuits of FIGS. 13 and 30 and by additionally providing a video signal system. The circuit of FIG. 32 operates in the same manner as that of FIG. 31.

The present invention has various advantages as follows. In the two modes different from each other in quantity of information to be recorded or transmitted, the quantity of data is controlled before and after a signal processing circuit, so that the data configuration in a data frame can be made equal in the two different modes. The recording rate or the transmission rate can be lowered by deleting unnecessary information after signal processing. Further, the fundamental capability, such as interleave, error correction code length, and so on, is not changed and the circuit is not made complicated.

Further, according to the present invention, the control on the quantity of information is made on the symbol basis, which is a fundamental unit of performing the error correction and group code modulation, before and after a signal processing circuit, so that it is possible to prevent error propagation from occurring at the time of recording and transmission.

Further, according to the present invention, in the PCM signal reproducing circuit, a signal is reproduced by supplementing fixed data which have been deleted and a signal processing circuit at the time of reproducing operation can be made common to the two modes.

Further, if the PCM data generating and reproducing circuits according to the present invention are applied to an 8 mm VTR, the modes A and B can be made to correspond to ME and MP tapes respectively, and the inequality in performance in change-over of mode and complication of circuit can be eliminated.

We claim:

1. A PCM signal generating apparatus for recording/transmitting a PCM signal comprising:
   an input device for receiving, word by word, a first signal comprising a plurality of words that are composed of n bits per word and a second signal comprising a plurality of words that are composed of n' bits per word, each of n and n' being an integer;
   a data addition circuit for adding fixed data composed of (n−n') bits to every word of the second signal in order to generate a third signal;
   first switch means connected to receive the first and third signals for selectively outputting one of the first and third signals, the first and third signals each comprising a plurality of words;
   a symbol generation circuit for converting every word of the output of said first switch means into symbol data composed of m×l bits, m and l being integers and n being greater than l;
   a signal processing circuit for performing at least one of interleave processing, error correction code generation processing, and synchronizing signal addition processing on the output of said symbol generation circuit in order to generate a first data frame;
   a data deletion circuit for deleting fixed data composed of (n−n') bits from the first data frame of said signal processing circuit in order to generate a second data frame; and
   second switch means connected to receive the first data frame from said signal processing circuit and the second data frame from said data deletion circuit in order to select and output the first data frame when said first switch means outputs the first signal and in order to select and output the second data frame when said first switch means outputs the third signal.

2. A PCM signal generating apparatus according to claim 1, wherein said input device includes a compression circuit connected to receive the first signal for digitally compressing the first signal in order to convert the first signal into the second signal.

3. A PCM signal generating apparatus according to claim 1, wherein said data addition circuit is for adding fixed data composed of (n−n') bits to the end of the second signal in order to generate the third signal, and wherein said symbol generation circuit is for dividing the third signal into symbol data composed of an actual data portion having l bits and a symbol data portion composed of actual data having l−(n−N') bits and fixed data having (n−n') bits, when said first switch means outputs the third signal.

4. A PCM signal generating apparatus according to claim 2, wherein said data addition circuit is for adding fixed data composed of (n−n') bits to the end of the second signal in order to generate the third signal, and wherein said symbol generation circuit is for dividing the third signal into a symbol data portion composed of an actual data portion having l bits and a symbol data portion composed of actual data having l−(n−n') bits and fixed data having (n−n') bits, when said first switch means outputs the third signal.

5. A PCM signal generating apparatus according to claim 1, wherein said data addition circuit is for adding fixed data composed of (n−n') bits to the end of the second signal in order to generate the third signal, and wherein said symbol generation circuit is for dividing the third signal into symbol data composed of an actual data portion having l bits and a symbol data portion composed of fixed data having l bits, when said first switch means outputs the third signal.

6. A PCM signal generating apparatus according to claim 2, wherein said data addition circuit is for adding fixed data composed of (n−n') bits to the end of the second signal in order to generate the third signal, and wherein said symbol generation circuit is for dividing the third signal into symbol data composed of an actual data portion having l bits and a symbol data portion composed of fixed data having l bits, when said first switch means outputs the third signal.

7. A PCM signal generating apparatus according to claim 1, wherein said signal processing circuit forms the first data frame in the form of a diagonal interleave for the error correction code generation processing.

8. A PCM signal generating apparatus according to claim 2, wherein said signal processing circuit forms the first data frame in the form of a diagonal interleave for the error correction code generation processing.

9. A reproducing apparatus for reproducing an original signal from PCM signal data frames generated by a PCM signal generating apparatus as defined in claim 1, said reproducing apparatus comprising:
   a data addition device connected to receive at least one of the PCM signal data frames for adding fixed data to a predetermined portion of the received PCM signal data frame;
   a first switching device connected to accept the received PCM signal data frame and an output of said data addition circuit in order to selectively output one of the received PCM signal data frame and the output of said data addition device;
   a signal processing device for performing at least one of de-interleave processing and error correction processing on the output of said first switching device and for outputting symbol data;
   a synthesizing circuit for synthesizing outputted symbol data from said signal processing device in order to form synthesized data;
   a data deletion device for deleting fixed data from the synthesized data;
   an expansion circuit for digitally expanding an output of said data deletion device; and a second switching device connected to receive the synthesized data from said synthesizing circuit and an output from said expansion circuit for selecting the synthesized data from said synthesizing circuit in order to output the selected synthesized data as a reproduction of the original signal when said first switching device outputs the received PCM signal data frame and for selecting an output from said expansion circuit in order to output the selected output from the expansion circuit as a reproduction of the original signal when said first switching device outputs the output of said data addition device.

10. A reproducing apparatus for reproducing an original signal from PCM signal data frames generated by a PCM signal generating apparatus as defined in claim 2, said reproducing apparatus comprising:
a data addition device connected to receive at least one of the PCM signal data frames for adding fixed data to a predetermined portion of the received PCM signal data frame;
a first switching device connected to accept the received PCM signal data frame and an output of said data addition circuit in order to selectively output one of the received PCM signal data frame and the output of said data addition device;
a signal processing device for performing at least one of de-interleave processing and error correction processing on the output of said first switching device and for outputting symbol data;
a synthesizing circuit for synthesizing outputted symbol data from said signal processing device in order to form synthesized data;
a data deletion device for deleting fixed data from the synthesized data;
an expansion circuit for digitally expanding an output of said data deletion device; and
a second switching device connected to receive the synthesized data from said synthesizing circuit and an output from said expansion circuit for selecting the synthesized data from said synthesizing circuit in order to output the selected synthesized data as a reproduction of the original signal when said first switching device outputs the received PCM signal data frame and for selecting an output from said expansion circuit in order to output the selected output from the expansion circuit as a reproduction of the original signal when said first switching device outputs the output of said data addition device.

11. A PCM signal generating apparatus according to claim 1, wherein said signal processing circuit forms the first data frame in the form of a rectangular interleave for the error correction code generation processing.

12. A PCM signal generating apparatus according to claim 2, wherein said signal processing circuit forms the first data frame in the form of a rectangular interleave for the error correction code generation processing.

13. A PCM signal generating apparatus for recording/transmitting a PCM signal comprising:
an input device for receiving, word by word, a first signal comprising a plurality of words that are composed of n bits per word and a second signal comprising a plurality of words that are composed of n' bits per word, each of n and n' being an integer;
a data addition circuit for adding fixed data of l bits to every k word of the second signal in order to generate a third signal comprising a plurality of words, l being an integer and k being equal to $l/(n-n')$;
a first symbol generation circuit for converting every word of the first signal into first symbol data composed of $m \times l$ bits, m being an integer and n being greater than l;
a second symbol generation circuit for converting every word of the third signal generated by said data addition circuit into second symbol data composed of $m \times l$ bits;
first switch means connected to receive the first and second symbol data for selectively outputting one of the first and second symbol data;
a signal processing circuit for performing at least one of interleave processing, error correction code generation processing, and synchronizing signal addition processing on one of the first and second symbol data outputted from said first switch means in order to form a first data frame;
a data deletion circuit for deleting fixed data composed of l bits from the first data frame formed by said signal processing circuit in order to generate a second data frame; and
second switch means connected to receive the first data frame from said signal processing circuit and the second data frame from said data deletion circuit in order to select and output the first data frame when said first switch means outputs the first symbol data and in order to select and output the second data frame when said first switch means outputs the second symbol data.

14. A PCM signal generating apparatus according to claim 13, wherein the signal processing circuit forms said first data frame in the form of a diagonal interleave for the error correction code generation processing.

15. A PCM signal generation apparatus according to claim 13, wherein said input device includes a compression circuit connected to receive the first signal for digitally compressing the first signal in order to convert the first signal into the second signal.

16. A PCM signal generating apparatus according to claim 13, wherein said second symbol generation circuit is for dividing the third signal into symbol data composed of an actual data portion having l bits and a symbol data portion composed of fixed data having l bits.

17. A PCM signal generating apparatus according to claim 13, wherein said second symbol generation circuit is for dividing the third signal into symbol data composed of an actual data portion having l bits and a symbol data portion composed of fixed data having l bits.

18. A PCM signal generating apparatus according to claim 13, wherein said signal processing circuit forms the first data frame in the form of a rectangular interleave for the error correction code generation processing.

19. A PCM signal generating apparatus according to claim 15, wherein said signal processing circuit forms the first data frame in the form of a rectangular interleave for the error correction code generation processing.

20. A PCM signal generating apparatus according to claim 15, wherein said signal processing circuit forms said the first data frame in the form of a diagonal interleave for the error correction code generation processing.

21. A reproducing apparatus for reproducing an original signal from PCM signal data frames generated by a PCM signal generating apparatus as defined in claim 13, said reproducing apparatus comprising:
- a data addition device connected to receive at least one of the PCM signal data frames for adding fixed data to a predetermined portion of the received PCM signal data frame;
- a first switching device connected to accept the received PCM signal data frame and an output of said data addition circuit in order to selectively output one of the received PCM signal data frame and the output of said data addition device;
- a signal processing device for performing at least one of de-interleave processing and error correction processing on the output of said first switching device and for outputting symbol data;
- a first and a second synthesizing circuit for synthesizing outputted symbol data from said signal processing device in order to form synthesized data;
- a data deletion device for deleting fixed data from synthesized data formed by said second synthesizing circuit;
- an expansion circuit for digitally expanding an output of said data deletion device; and
- a second switching device connected to receive synthesized data formed by said first synthesizing circuit and an output of said expansion circuit for selecting the synthesized data formed by said first synthesizing circuit in order to output the selected synthesized data as a reproduction of the original signal when said first switching device outputs the received PCM signal data frame and for selecting an output from the expansion circuit as a reproduction of the original signal when said first switching device outputs an output of said data addition device.

22. A reproducing apparatus for reproducing an original signal from PCM signal data frames generated by a PCM signal generating apparatus as defined in claim 15, said reproducing apparatus comprising:
- a data addition device connected to receive at least one of the PCM signal data frames for adding fixed data to a predetermined portion of the received PCM signal data frame;
- a first switching device connected to accept the received PCM signal data frame and an output of said data addition circuit in order to selectively output one of the received PCM signal data frame and the output of said data addition device;
- a signal processing device for performing at least one of de-interleave processing and error correction processing on the output of said first switching device and for outputting symbol data;
- a first and a second synthesizing circuit for synthesizing outputted symbol data from said signal processing device in order to form synthesized data;
- a data deletion device for deleting fixed data from synthesized data formed by said second synthesizing circuit;
- an expansion circuit for digitally expanding an output of said data deletion device; and
- a second switching device connected to receive synthesized data formed by said first synthesizing circuit and an output of said expansion circuit for selecting the synthesized data formed by said first synthesizing circuit in order to output the selected synthesized data as a reproduction of the original signal when said first switching device outputs the received PCM signal data frame and for selecting an output from said expansion circuit in order to output the selected output from the expansion circuit as a reproduction of the original signal when said first switching device outputs an output of said data addition device.

23. A PCM data recording/reproducing apparatus comprising:
- an input device for receiving, word by word, a first signal comprising a plurality of words that are composed of n bits per word and a second signal comprising a plurality of words that are composed of n' bits per word, each of n and n' being an integer;
- a first data addition circuit for adding fixed data composed of (n−n') bits to every word of the second signal in order to generate a third signal;
- first switch means connected to receive the first and third signals for selectively outputting one of the first and third signals, the first and third signals each comprising a plurality of words;
- a symbol generation circuit for converting every word of the output of said first switch means into symbol data composed of m×l bits, m and l being integers and n being greater than l;
- a first signal processing circuit for performing at least one of interleave processing, error correction code generation processing, and synchronizing signal addition processing on the output of said symbol generation circuit in order to generate a first data frame;
- a first data deletion circuit for deleting fixed data composed of (n−n') bits from the first data frame of said first signal processing circuit in order to generate a second data frame;
- second switch means connected to receive the first data frame from said first signal processing circuit and the second data frame from said first data deletion circuit in order to select and output the first data frame when said first switch means outputs the first signal and in order to select and output the second data frame when said first switch means outputs the third signal;
- modulation means for modulating the output of said second switch means and for producing an output;
- record means for recording the output of said modulation means onto a recording medium;
- pick-up means for picking up a PCM signal from the recording medium and for providing an output;
- demodulation means for demodulating the output of said pick-up means and for outputting PCM signal data;
- a second data addition circuit connected to receive PCM signal data from said demodulation circuit for adding fixed data to a predetermined portion of the PCM signal data in order to provide an output;
- third switch means connected to receive the output of said demodulation circuit and the output of said second data addition circuit in order to selectively output one of the output of said demodulation circuit and the output of said second data addition circuit;
- a second signal processing circuit for performing at least one of de-interleave processing and error correction processing on the output of said third switch means and for outputting symbol data;
- a synthesizing circuit for synthesizing outputted symbol data from said second signal processing circuit in order to form synthesized data;

a second data deletion circuit for deleting fixed data from said synthesized data;

an expansion circuit for digitally expanding an output of said second data deletion circuit; and fourth switch means connected to receive the synthesized data from said synthesizing circuit an output from said expansion circuit for selecting the synthesized data from said synthesizing circuit in order to output the selected synthesized data as a reproduction of the original signal when said third switch means outputs the output of said demodulation circuit and for selecting the output from said expansion circuit in order to output the selected output from the expansion circuit as a reproduction of the original signal when said third switch means outputs the output of said second data addition circuit.

24. A PCM data recording/reproducing apparatus comprising:

an input portion for receiving, word by word, a first signal comprising a plurality of words that are composed on n bits per word and a second signal comprising a plurality of words that are composed of n' bits per word, each of n and n' being an integer;

a data addition circuit for adding fixed data composed of l bits to every two words of the second signal in order to generate a third signal;

a first symbol generation circuit for converting every word of the first signal of the input device into first symbol data composed of m×l bits, n being greater than l, l being a common divisor between n and n', and m being an integer;

a second symbol generation circuit for converting every word of the third signal of said data addition circuit into second symbol data composed of m×l bits;

first switch means connected to receive the first and second symbol data for selectively outputting one of the first and second symbol data;

a first signal processing circuit for performing at least one of interleave processing, error correction code generation processing, and synchronizing signal addition processing on one of the first and second symbol data outputted from said first switch means in order to form a first data frame;

a first data deletion circuit for deleting fixed data composed of l bits from the first data frame of said first signal processing circuit in order to generate a second data frame;

second switch means connected to receive the first data frame from said first signal processing circuit and the second data frame from said first data deletion circuit in order to select and output the first data frame when said first switch means outputs the first symbol data and in order to select and output the second data frame when said first switch means outputs the second symbol data;

modulation means for modulating the output of said second switch means and for producing an output;

record means for recording the output of said modulation means onto a recording medium;

pick-up means for picking up a PCM signal from the recording medium and for producing an output;

demodulation means for demodulating the output of said pick-up means and for outputting PCM signal data;

a second data addition circuit connected to receive PCM signal data from said demodulation circuit for adding fixed data to a predetermined portion of the PCM signal data in order to produce an output;

third switch means connected to receive the output of said demodulation circuit and the output of said second data addition circuit in order to selectively output one of the output of said demodulation circuit and the output of said second data addition circuit;

a second signal processing circuit for performing at least one of de-interleave processing and error correction processing on the output of said third switch means and for outputting symbol data;

a first and a second synthesizing circuit for synthesizing outputted symbol data from said second signal processing circuit in order to form synthesized data;

a second data deletion circuit for deleting fixed data from synthesized data formed by said second synthesizing circuit;

an expansion circuit for digitally expanding an output of said second data deletion circuit; and fourth switch means connected to receive synthesized data formed by said first synthesizing circuit and an output from said expansion circuit for selecting the synthesized data formed by said first synthesizing circuit in order to output the selected synthesized data as a reproduction of the original signal when said third switch means outputs the output of said demodulation circuit and for selecting an output from said expansion circuit in order to output the selected output from said expansion circuit as a reproduction of the original signal when said third switch means outputs the output of said second data addition circuit.

* * * * *